United States Patent
Yoshizawa

(10) Patent No.: US 10,477,555 B2
(45) Date of Patent: Nov. 12, 2019

(54) DEVICE AND METHOD FOR NON-ORTHOGONAL MULTIPLEXING

(71) Applicant: SONY CORPORATION, Tokyo (JP)

(72) Inventor: Atsushi Yoshizawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 67 days.

(21) Appl. No.: 15/535,095

(22) PCT Filed: Oct. 1, 2015

(86) PCT No.: PCT/JP2015/077988
§ 371 (c)(1),
(2) Date: Jun. 12, 2017

(87) PCT Pub. No.: WO2016/103831
PCT Pub. Date: Jun. 30, 2016

(65) Prior Publication Data
US 2017/0325238 A1    Nov. 9, 2017

(30) Foreign Application Priority Data

Dec. 25, 2014 (JP) .................................. 2014-262309

(51) Int. Cl.
*H04W 72/04* (2009.01)
*H04J 11/00* (2006.01)
(Continued)

(52) U.S. Cl.
CPC ......... *H04W 72/0466* (2013.01); *H04J 11/00* (2013.01); *H04J 13/16* (2013.01);
(Continued)

(58) Field of Classification Search
CPC .......... H04W 72/042; H04W 72/0406; H04W 72/02; H04W 72/1289; H04W 74/0825;
(Continued)

(56) References Cited

U.S. PATENT DOCUMENTS

2014/0140360 A1* 5/2014 Nikopour ................ H04J 13/00
                                                                    370/479
2014/0254455 A1   9/2014 Nikopour et al.
(Continued)

FOREIGN PATENT DOCUMENTS

AU    2013347359 A1   6/2015
CA      2891623 A1    5/2014
(Continued)

OTHER PUBLICATIONS

Nikopour, et al.,"Sparse Code Mutiple Access", IEEE 24th International Symposium on Personal, Indoor and Mobile Radio Communications: Fundamentals and PHY Track, 2013, pp. 332-336.
(Continued)

*Primary Examiner* — Jae Y Lee
*Assistant Examiner* — Aixa A Guadalupe Cruz
(74) *Attorney, Agent, or Firm* — Chip Law Group

(57) ABSTRACT

Provided is a device including an acquisition unit to acquire that acquires information indicating a layer allocated to a terminal device among a plurality of layers that are subject to non-orthogonal multiplexing using a codebook and a reporting unit that reports the layer to the terminal device.

16 Claims, 18 Drawing Sheets

(51) Int. Cl.
  *H04J 13/16* (2011.01)
  *H04J 99/00* (2009.01)
(52) U.S. Cl.
  CPC ............ *H04J 15/00* (2013.01); *H04W 72/04* (2013.01); *H04W 72/042* (2013.01)
(58) Field of Classification Search
  CPC . H04W 88/02; H04W 88/08; H04W 72/0413; H04W 72/04; H04W 72/0453; H04W 72/044; H04W 72/0446; H04W 72/046; H04W 72/12; H04L 5/0016; H04L 1/1812
  See application file for complete search history.

(56) References Cited

U.S. PATENT DOCUMENTS

| | | | |
|---|---|---|---|
| 2014/0254544 A1 | 9/2014 | Kar Kin Au et al. | |
| 2015/0282185 A1* | 10/2015 | Nikopour | H04L 1/0002 370/329 |
| 2017/0289979 A1* | 10/2017 | Xu | H04L 1/06 |

FOREIGN PATENT DOCUMENTS

| | | |
|---|---|---|
| CN | 104798317 A | 7/2015 |
| KR | 10-2015-0085026 A | 7/2015 |
| WO | 2014/075637 A1 | 5/2014 |
| WO | 2014/135122 A1 | 9/2014 |
| WO | 2014/135126 A1 | 9/2014 |

OTHER PUBLICATIONS

Au, et al., "Uplink Contention Based SCMA for 5G Radio Access", Globecom 2014 Workshop—Emerging Technologies for 5G Wireless Cellular Networks, Dec. 8-12, 2014, pp. 900-905.

Nikopour, et al., "SCMA for Downlink Multiple Access of 5G Wireless Networks, Global Communications Conference (GLOBECOM)", 2014 IEEE, Dec. 2014, pp. 3940-3945.

Nikopour, et al., "Sparse Code Multiple Access, Personal Indoor and Mobile Radio Communications (PIMRC)", 2013 IEEE 24th International Symposium on, Sep. 2013, pp. 332-336.

Au, et al., Uplink Contention Based SCMA for 5G Radio Access, Globe Com Workshops (GC Wkshps), Dec. 2014, pp. 900-905.

International Search Report and Written Opinion of PCT Application No. PCT/JP2015/077988, dated Nov. 2, 2015, 02 pages of English Translation and 07 pages of ISRWO.

Nikopour, et al., "Sparse Code Multiple Access", 2013 IEEE 24th International Symposium on Personal, Indoor and Mobile Radio Communications: Fundamentals and PHY Track, Sep. 14-17, 2014, pp. 332-336.

* cited by examiner

FIG. 3

CODE BLOCK 1

$(0,0) \Rightarrow x_{11} = (x_{111}, x_{112}, 0, 0)$
$(0,1) \Rightarrow x_{12} = (x_{121}, x_{122}, 0, 0)$
$(1,0) \Rightarrow x_{13} = (x_{131}, x_{132}, 0, 0)$
$(1,1) \Rightarrow x_{14} = (x_{141}, x_{142}, 0, 0)$

CODE BLOCK 2

$(0,0) \Rightarrow x_{21} = (0, 0, x_{213}, x_{214})$
$(0,1) \Rightarrow x_{22} = (0, 0, x_{223}, x_{224})$
$(1,0) \Rightarrow x_{23} = (0, 0, x_{233}, x_{234})$
$(1,1) \Rightarrow x_{24} = (0, 0, x_{243}, x_{244})$

CODE BLOCK 3

$(0,0) \Rightarrow x_{31} = (x_{311}, 0, x_{313}, 0)$
$(0,1) \Rightarrow x_{32} = (x_{321}, 0, x_{323}, 0)$
$(1,0) \Rightarrow x_{33} = (x_{331}, 0, x_{333}, 0)$
$(1,1) \Rightarrow x_{34} = (x_{341}, 0, x_{343}, 0)$

CODE BLOCK 4

$(0,0) \Rightarrow x_{41} = (0, x_{412}, 0, x_{414})$
$(0,1) \Rightarrow x_{42} = (0, x_{422}, 0, x_{424})$
$(1,0) \Rightarrow x_{43} = (0, x_{432}, 0, x_{434})$
$(1,1) \Rightarrow x_{44} = (0, x_{442}, 0, x_{444})$

CODE BLOCK 5

$(0,0) \Rightarrow x_{51} = (x_{511}, 0, 0, x_{514})$
$(0,1) \Rightarrow x_{52} = (x_{521}, 0, 0, x_{524})$
$(1,0) \Rightarrow x_{53} = (x_{531}, 0, 0, x_{534})$
$(1,1) \Rightarrow x_{54} = (x_{541}, 0, 0, x_{544})$

CODE BLOCK 6

$(0,0) \Rightarrow x_{61} = (0, x_{612}, x_{613}, 0)$
$(0,1) \Rightarrow x_{62} = (0, x_{622}, x_{623}, 0)$
$(1,0) \Rightarrow x_{63} = (0, x_{632}, x_{633}, 0)$
$(1,1) \Rightarrow x_{64} = (0, x_{642}, x_{643}, 0)$

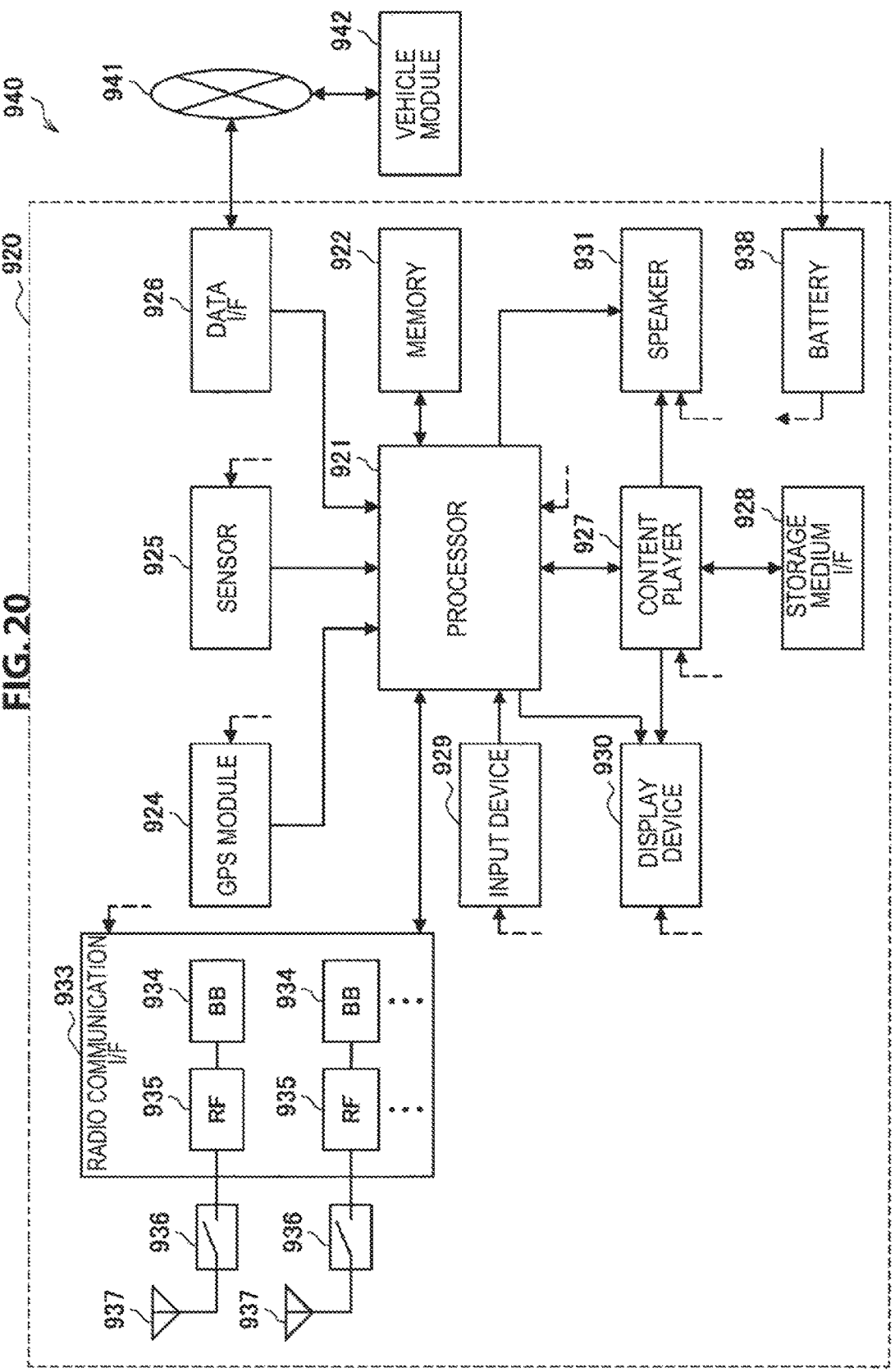

DEVICE AND METHOD FOR NON-ORTHOGONAL MULTIPLEXING

CROSS REFERENCE TO RELATED APPLICATIONS

This application is a U.S. National Phase of International Patent Application No. PCT/JP2015/077988 filed on Oct. 1, 2015, which claims priority benefit of Japanese Patent Application No. JP 2014-262309 filed in the Japan Patent Office on Dec. 25, 2014. Each of the above-referenced applications is hereby incorporated herein by reference in its entirety.

TECHNICAL FIELD

The present invention relates to a device.

BACKGROUND ART

In recent years, various new radio access schemes have been discussed in various fields for the next fifth generation radio scheme of Long Term Evolution (LTE). In particular, non-orthogonal multiplexing and non-orthogonal multiple access have been discussed. Amid this situation, a new multiple access scheme called sparse code multiple access (SCMA) has been proposed.

Non-patent Literature 1, for example, discloses SCMA. In addition, Patent Literature 1, for example, discloses examples of a codeword generation technique using codebooks of SCAM and a designing technique of codebooks.

CITATION LIST

Patent Literature

Patent Literature 1: US 2014/0140360A

Non-Patent Literature

Non-Patent Literature 1: Sparse Code Multiple Access, in 2013 IEEE 24th International Symposium on Personal, Indoor and Mobile Communications

DISCLOSURE OF INVENTION

Technical Problem

In SCMA, a codeword of each of a plurality of layers that are subject to multiplexing is generated from data of the layer on the basis of a codebook for the layer, and the codeword is transmitted.

However, because a fixed layer is not necessarily decided to be allocated to a terminal device, it is difficult for the terminal device to perform a communication process for a layer allocated to the terminal device if the terminal device does not ascertain the layer.

Thus, it is desirable to provide a mechanism which enables a terminal device to ascertain a layer allocated to the terminal device when non-orthogonal multiplexing using a codebook is used.

Solution to Problem

According to the present disclosure, there is provided a device including: an acquisition unit configured to acquire information indicating a layer allocated to a terminal device among a plurality of layers that are subject to non-orthogonal multiplexing using a codebook; and a reporting unit configured to report the layer to the terminal device.

According to the present disclosure, there is provided a method performed by a processor, the method including: acquiring information indicating a layer allocated to a terminal device among a plurality of layers that are subject to non-orthogonal multiplexing using a codebook; and reporting the layer to the terminal device.

According to the present disclosure, there is provided a device including: an acquisition unit configured to acquire information indicating a layer allocated to a terminal device among a plurality of layers that are subject to non-orthogonal multiplexing using a codebook; and a communication processing unit configured to perform a communication process for the layer on the basis of the information indicating the layer.

Advantageous Effects of Invention

According to the present disclosure described above, a terminal device can ascertain a layer allocated to the terminal device when non-orthogonal multiplexing using a codebook is used. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an explanatory diagram for describing examples of codebooks.

FIG. 9 is an explanatory diagram for describing a first example of mapping of codewords of a plurality of layers to radio resources.

FIG. 10 is an explanatory diagram for describing a second example of mapping of codewords of a plurality of layers to radio resources.

FIG. 20 is a block diagram illustrating an example of a schematic configuration of a car navigation device.

MODE(S) FOR CARRYING OUT THE INVENTION

Figure 1:
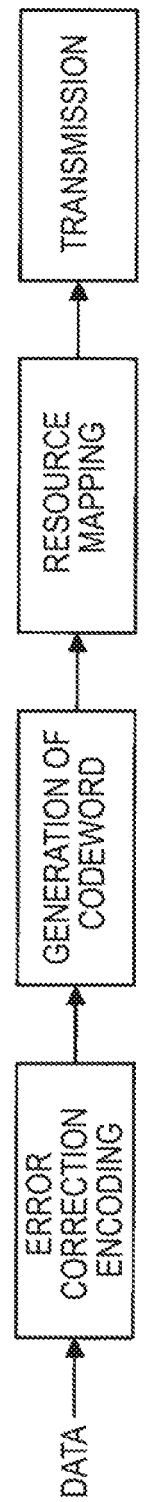
FIG. 1 is an explanatory diagram for describing an example of a schematic process of SCMA.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as terminal devices 200A, 200B and 200C as necessary. On the other hand, when none of the multiple elements having substantially the same function and structure is particularly distinguished, only the same sign will be given. For example, the terminal devices 200A, 200B and 200C will be simply designated as the terminal device 200 when not particularly distinguished.

Note that description will be provided in the following order.
1. Introduction
1.1. SCMA
1.2. Technical problem
2. Schematic configuration of system
3. Configuration of each device
3.1. Configuration of base station
3.2. Configuration of terminal device
4. Technical features
5. Process flow
6. Application examples
6.1. Application examples with respect to base station
6.2. Application example with respect to terminal device
7. Conclusion

«1. INTRODUCTION»

As an introduction, SCMA and technical problems will be described with reference to FIGS. 1 to 4.

<1.1. SCMA>

First, SCMA will be described with reference to FIGS. 1 to 4.

(1) Schematic Process Flow

FIG. 1 is an explanatory diagram for describing an example of a schematic process of SCMA.

In SCMA, for example, error correction encoding is performed and codewords are generated from data (binary data) that has undergone the error correction encoding on the basis of a codebook. Specifically, the codebook is, for example, information indicating correspondences between data candidates and codewords, and the data is converted into a codeword corresponding to the data in the codebook. Note that codebooks for each layer are prepared for the purpose of layer separation.

Further, each signal element included in the generated codewords is mapped to a corresponding radio resource. For example, codewords of a plurality of layers are multiplexed first, and then each signal element included in the multiplexed codewords is mapped to a corresponding radio resource. Alternatively, for each of a plurality of layers, each signal element included in codewords of the layers may be mapped to a corresponding radio resource, and then two or more signal elements mapped to the same radio resource (i.e., signal elements of different layers) may be multiplexed.

Then, the signal elements mapped to the radio resource are transmitted.

As described above, codewords of a plurality of layers are transmitted on the same radio resource. That is, the radio resource is shared by the plurality of layers. For this reason, SCMA is a non-orthogonal access scheme, not an orthogonal access scheme like OFDMA.

(2) Generation of Codewords

Figure 2:
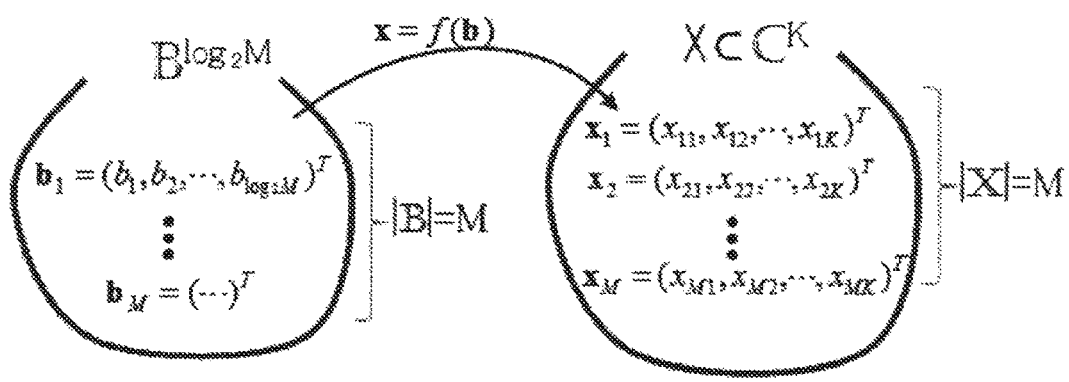
FIG. 2 is an explanatory diagram for describing an example of generation of codewords based on codebooks.

FIG. 2 is an explanatory diagram for describing an example of generation of codewords based on codebooks. Referring to FIG. 2, data candidates $b_i$ and codewords $x_j$ are shown. Sizes of the codebooks, i.e., the number of data candidates $b_i$ and the number of codewords $x_j$, are both M. In this case, data that is input information is, for example, a vector including bits as elements and has a length of $\log_2 M$. In addition, a codeword that is output information is a vector including a complex number as a signal element and has the same length as the number of radio resources K to be used in transmission of codewords. Thus, a codebook can also be said to be a function in which input information and output information are both vectors. The codewords that are output information are required to satisfy a desired condition suitable for layer multiplexing.

(3) Example of Codebooks

FIG. 3 is an explanatory diagram for describing examples of codebooks. Referring to FIG. 3, codebooks 1 to 6 are shown. The codebooks 1 to 6 are codebooks for Layer 1 to Layer 6. As such, codebooks for each layer are prepared in SCMA. In this example, data that is input information is 2-bit data, and the number of data candidates is 4. Thus, the number of codewords in each codebook is also 4. 2 of 4 signal elements (i.e., complex numbers) are 0 in a codeword of each codebook, and 2 different codewords are sparse. In addition, 2 of the four signal elements in the codeword of each codebook are not 0. That is, the number of signal elements N that are not 0 among the 4 signal elements is 2.

(4) Example of Resource Mapping

Figure 4:
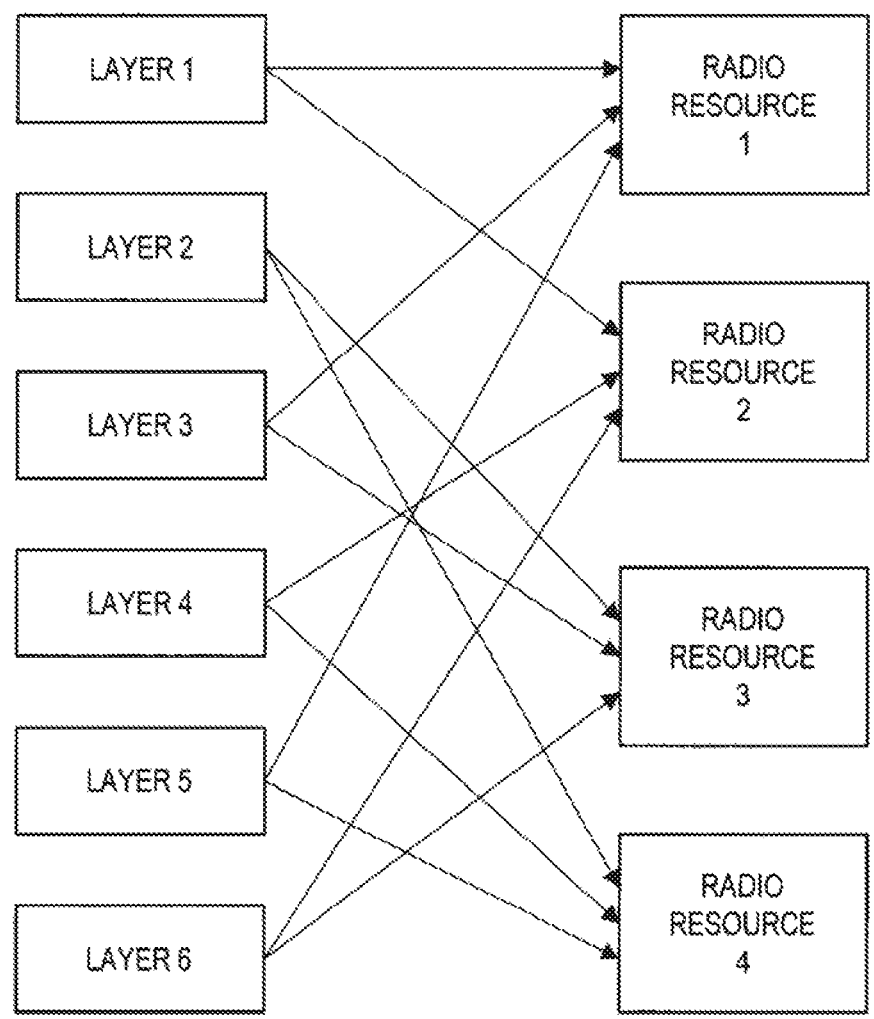
FIG. 4 is an explanatory diagram for describing an example of resource mapping of codebooks.

FIG. 4 is an explanatory diagram for describing an example of resource mapping of codebooks. Referring to FIG. 4, 6 layers and 4 radio resources are shown. In this example, the number of signal elements in a codeword of each layer is 4, and thus 4 radio resources are prepared. For example, signal elements that are not 0 (i.e., 2 signal elements) among 4 signal elements included in the codeword of each layer are mapped to corresponding radio resources. Specifically, for example, a first signal element in a codeword of Layer 1 is mapped to radio resource 1, and a second signal element in the codeword of Layer 1 is mapped to radio resource 2. A first signal element in a codeword of Layer 3 is, for example, mapped to radio resource 1, and a third signal element in the codeword of Layer 3 is mapped to radio resource 3.

In this example, an allowable number of layers J is equal to 2 combinations among the 4 radio resources ($_4C_2=6$). When 6 layers are mapped to 4 radio resources as above, realized overhead is 150%.

(5) Process on Reception Side

In SCMA, a transmission side performs multiplexing of sparse codewords as described above. Meanwhile, a technique called, for example, a message passing algorithm using an iterative operation is used on a reception side. According to the message passing technique, a reception device refers to, for example, reception signals of 4 radio resources and estimates an input vector that maximizes a posterior probability of the reception signals.

More generally, for example, codewords of J layers are mapped to K radio resources. In this case, if a codeword of a j-th layer is indicated as $x_j=(x_{1j}, \ldots, x_{Kj})$, a reception signal $y_k$ on a k-th radio resource is expressed as below.

$$y_k = h_k \sum_{j=1}^{J} x_{kj} + n_k \quad \text{[Math. 1]}$$

Here, $h_k$ represents a channel characteristic of the k-th radio resource, and $n_k$ represents a noise component added to the k-th radio resource. In this case, $X^\wedge$ below is an estimated value of an input vector $X=(x_1, x_2, \ldots, x_J)$.

$$\hat{X} = \arg\max_X p(X \mid y) \quad \text{[Math. 2]}$$

In order to realize this, the reception side uses successive interference cancellation (SIC). In SIC, the reception device sequentially cancels reception signals of other layers as interference components in the course of demodulating reception signals of a certain layer. Through such a process, reception signals of the layers are separated and a reception signal of a desired layer is obtained.

<1.2. Technical Problems>

Next, technical problems according to an embodiment of the present disclosure will be described.

(1) First Problem

In SCMA, a codeword of each of a plurality of layers that are subject to multiplexing is generated from data of the layer on the basis of a codebook for the layer, and the codeword is transmitted.

However, because a fixed layer is not necessarily decided to be allocated to a terminal device, it is difficult for the terminal device to perform a communication process for a layer allocated to the terminal device if the terminal device does not ascertain the layer.

As an example, when a terminal device is in a connected mode and the terminal device performs a DRX operation, a base station intermittently transmits data to the terminal device. As another example, when semi-persistent communication such as voice communication (i.e., communication in which reception of data is intermittently performed only in a pre-determined pattern) is performed, traffic occurs only in a specific period, and continuous transmission of data is not performed. In these examples, layers to be allocated to a terminal device can change in accordance with time.

Therefore, it is desirable to provide a mechanism in which a terminal device can ascertain a layer allocated to the terminal device when non-orthogonal multiplexing using a codebook is used.

(2) Second Problem

In SCMA, a codeword of each of a plurality of layers that are subject to multiplexing is generated from data of the layer on the basis of a codebook for the layer, and the codeword is transmitted.

However, since an amount of transmission data and/or the number of terminal devices in a cell are not fixed but can be changed, the number of layers that are subject to multiplexing can also change. Thus, if codebooks that are on the assumption of an acceptable maximum number of layers are used even though the number of layers is fewer, use efficiency of radio resources can be lowered.

As an example, when a terminal device is in a connected mode and the terminal device performs a DRX operation, a base station intermittently transmits data to the terminal device. As another example, when semi-persistent communication such as voice communication (i.e., communication in which reception of data is intermittently performed only in a pre-determined pattern) is performed, traffic occurs only in a specific period and continuous transmission of data is not performed. In these examples, the number of layers that are subject to multiplexing can change in accordance with time.

Therefore, it is desirable to provide a mechanism that enables radio resources to be used more efficiently when non-orthogonal multiplexing using a codebook is used.

«2. Schematic Configuration of System»

Figure 5:
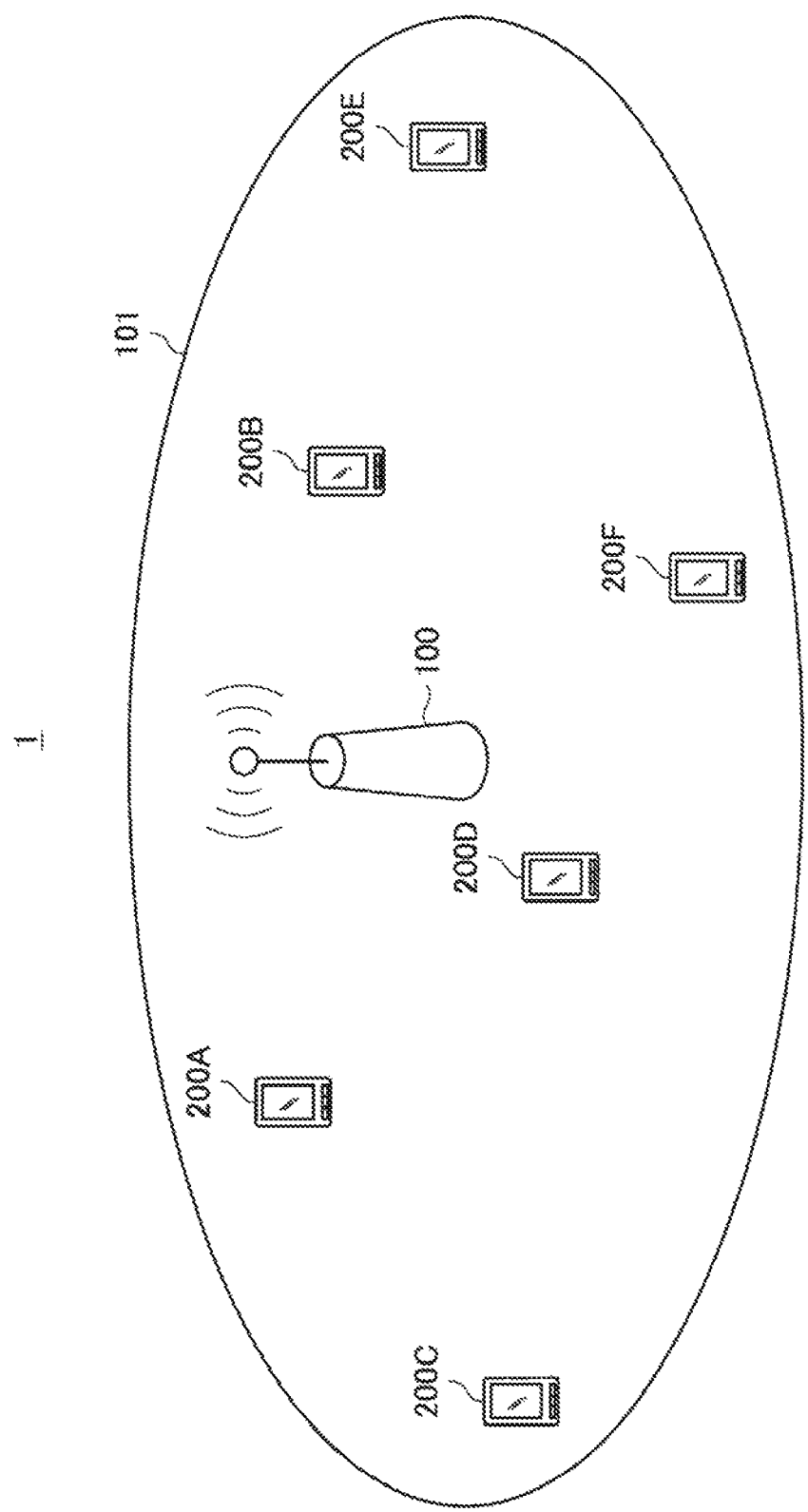
FIG. 5 is an explanatory diagram illustrating an example of a schematic configuration of a system according to an embodiment of the present disclosure.

Subsequently, a schematic configuration of a system 1 according to an embodiment of the present disclosure will be described with reference to FIG. 5. FIG. 5 is an explanatory diagram illustrating an example of a schematic configuration of the system 1 according to an embodiment of the present disclosure. Referring to FIG. 5, the system 1 includes a base station 100 and a terminal device 200 (for example, terminal devices 200A to 200F).

(1) Base Station 100

The base station 100 is a base station of a mobile communication system (or a cellular system). The base station 100 performs radio communication with terminal devices (e.g., the terminal device 200) positioned within a cell 101. The base station 100, for example, transmits downlink signals to terminal devices and receives uplink signals from terminal devices.

(2) Terminal Device 200

The terminal device 200 is a terminal device that can communicate in the mobile communication system (or cellular system). The terminal device 200 performs radio communication with base stations (e.g., the base station 100). The terminal device 200, for example, receives downlink signals from base stations and transmits uplink signals from base stations.

(3) Non-Orthogonal Multiplexing Using Codebook

In an embodiment of the present disclosure, in particular, non-orthogonal multiplexing/non-orthogonal multiple access using a codebook is performed.

The codebook is, for example, a codebook of sparse codes (SCs). The non-orthogonal multiple access using the codebook is SCMA, and the non-orthogonal multiplexing using the codebook is multiplexing in SCMA.

Non-orthogonal multiplexing/non-orthogonal multiple access using codebooks are performed in, for example, downlink. Alternatively, non-orthogonal multiplexing/non-orthogonal multiple access using codebooks may be performed in uplink.

«3. Configurations of Devices»

Next, examples of configurations of the base station 100 and the terminal device 200 according to the embodiment of the present disclosure will be described with reference to FIGS. 6 and 7.

<3.1. Configuration of Base Station>

First, an example of a configuration of the base station 100 according to the embodiment of the present disclosure will be described with reference to FIG. 6. FIG. 6 is a block diagram illustrating the example of the configuration of the base station 100 according to the embodiment of the present disclosure. According to FIG. 6, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes an allocation unit 151, a selection unit 153, an information acquisition unit 155, a reporting unit 157, and a communication processing unit 159. Note that the processing unit 150 can further include other constituent elements than the constituent elements. That is, the processing unit 150 can perform operations other than operations of the constituent elements.

The allocation unit 151, the selection unit 153, the information acquisition unit 155, the reporting unit 157, and the communication processing unit 159 will be described below in detail.

<3.2. Configuration of Terminal Device>

Next, an example of a configuration of the terminal device 200 according to the embodiment of the present disclosure will be described with reference to FIG. 7. FIG. 7 is a block diagram illustrating the example of the configuration of the terminal device 200 according to the embodiment of the present disclosure. According to FIG. 7, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an information acquisition unit 241 and a communication processing unit 243. Note that the processing unit 240 may further include a structural element other than these structural elements. That is, the processing unit 240 may perform operation other than the operation of these structural elements.

The information acquisition unit 241 and the communication processing unit 243 will be described below in detail.

«4. Technical Features»

Next, technical features according to the embodiment of the present disclosure will be described with reference to FIGS. 8 to 14.

(1) Allocation (a) Allocation of Resources

The base station 100 (the allocation unit 151) allocates, for example, radio resources to the terminal device 200.

The radio resources are, for example, radio resources to be used in transmission of codewords. More specifically, the radio resources are, for example, blocks corresponding to lengths of codewords. This point will be described below exemplifying the blocks with reference to FIG. 8.

Figure 8:
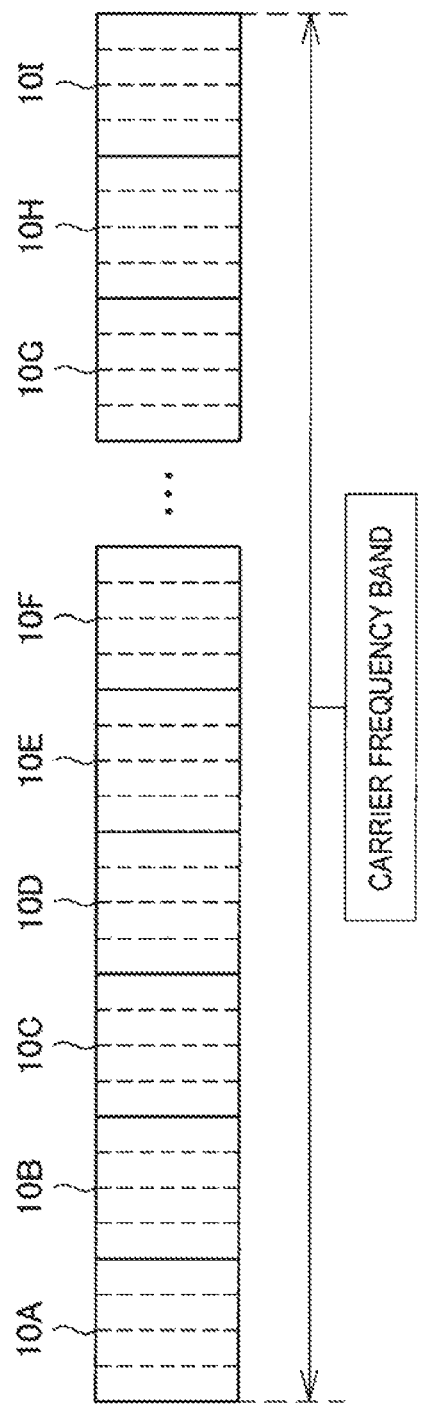
FIG. 8 is an explanatory diagram for describing an example of blocks which are radio resources to be used in transmission of codewords.

FIG. 8 is an explanatory diagram for describing an example of the blocks which are radio resources to be used in transmission of codewords. Referring to FIG. 8, a carrier frequency band is shown. The carrier frequency band includes a plurality of blocks 10 (e.g., blocks 10A to 10I, etc.). A length of a codeword (i.e., the number of signal elements included in a codeword) is, for example, 4, and each block 10 includes 4 subcarriers in the frequency direction. As an example, the subcarriers are deployed at an interval of 12 kHz. The blocks 10 also include predetermined periods in a time direction. The predetermined periods are, for example, symbols, slots, subframes, or radio frames. The blocks 10 may be resource blocks that are units of allocation of radio resources, or may be sub-resource blocks that are a part of the resource blocks. The base station 100 (the allocation unit 151) allocates one or more blocks 10 to the terminal device 200. In addition, the base station 100 (the allocation unit 151) allocates the same block 10 to two or more terminal devices 200. The base station 100 (the allocation unit 151) allocates, for example, the same block 10 to the terminal devices 200A to 200F.

Although the example in which the blocks to be used in transmission of codewords are contiguous in the frequency direction has been described, the blocks are not limited thereto. The blocks may be, for example, non-contiguous in the frequency direction. That is, the blocks may include two or more discrete subcarriers in the frequency direction.

In addition, although the example in which a length of a codeword (and the number of subcarriers included in a block) is 4 has been described, the length (and the number) is not limited thereto. A length of a codeword (and the number of subcarriers included in a block) may be, for example, another length (and another number). The length (and the number) may be, for example, 6 or 12.

(b) Allocation of Layers

The base station 100 (the allocation unit 151) allocates, for example, each of a plurality of layers that are subject to non-orthogonal multiplexing using a codebook to the terminal device 200.

(b-1) Non-Orthogonal Multiplexing Using Codebook

As described above, the codebook is, for example, a codebook of sparse codes (SCs), and the non-orthogonal multiplexing using the codebook is multiplexing in SCMA.

(b-2) Plurality of Layers

The plurality of layers are, for example, layers of SCMA.

The number of layers of the plurality of layers is, for example, equal to or smaller than an acceptable maximum number. As an example, the acceptable maximum number is 6. That is, the base station 100 (the allocation unit 151) allocates each of 6 or fewer layers to the terminal device 200.

The base station 100 (the allocation unit 151) allocates, for example, each of 6 layers (Layer 1 to Layer 6) to the terminal device 200. The base station 100 (the allocation unit 151) allocates, for example, each of 5 layers (5 out of Layer 1 to Layer 6) to the terminal device 200.

Note that, as a length of a codeword (and the number of subcarriers to be used in transmission of a codeword) become greater, the acceptable maximum number increases, which, however, makes design of a codebook more difficult and increases a load of a reception process.

(b-3) Example of Allocation of Layers

The base station 100 (the allocation unit 151) allocates, for example, each of the plurality of layers to different terminal devices 200. As an example, the base station 100 (the allocation unit 151) allocates Layer 1 to the terminal device 200A, Layer 2 to the terminal device 200B, Layer 3 to the terminal device 200C, Layer 4 to the terminal device 200D, Layer 5 to the terminal device 200E, and Layer 6 to the terminal device 200F. Accordingly, for example, more terminal devices 200 can communicate at the same time.

Note that the base station 100 (the allocation unit 151) may allocate 2 or more layers to the same terminal device 200. As an example, the base station 100 (the allocation unit 151) may allocate Layer 1 and Layer 2 to the terminal device 200A. Accordingly, for example, a communication speed of the terminal device 200A can improve.

(b-4) Change of Number of Layers in Accordance with Change of Traffic

The base station 100 (the allocation unit 151) changes, for example, the number of layers of the plurality of layers that are subject to the non-orthogonal multiplexing in accordance with a change of traffic. The traffic is, for example, traffic within the cell 101 (i.e., traffic processed by the base station 100).

More specifically, when an amount of traffic within the cell 101 decreases, for example, the base station 100 (the allocation unit 151) changes the number of layers from a greater value to a smaller value. When an amount of traffic within the cell 101 increases, for example, the base station 100 (the allocation unit 151) changes the number of layers from a smaller value to a greater value.

(2) Reporting of Layer

The base station 100 (the information acquisition unit 155) acquires information indicating a layer to be allocated to the terminal device 200 among the plurality of layers (i.e., a plurality of layers that are subject to non-orthogonal multiplexing using a codebook). Then, the base station 100 (the reporting unit 157) reports the layer to the terminal device 200.

Accordingly, for example, the terminal device 200 can ascertain the layer allocated to the terminal device 200 when non-orthogonal multiplexing using a codebook is used.

(a) Reporting with DCI

The base station 100 (the reporting unit 157) reports, for example, the layer included in downlink control information (DCI) to the terminal device 200. The DCI is, for example, information transmitted on a physical downlink control channel (PDCCH).

The base station 100 (the reporting unit 157) reports, for example, Layer 1 allocated to the terminal device 200A to the terminal device 200A using DCI destined for the terminal device 200A. The base station 100 (the reporting unit 157) reports, for example, Layer 4 allocated to the terminal device 200D to the terminal device 200D using DCI destined for the terminal device 200D.

Accordingly, for example, dynamic allocation of layers (e.g., allocation of layers of each subframe) is possible. Thus, even when non-orthogonal multiplexing using a codebook is used, for example, the terminal device 200 can flexibly perform a DRX operation and/or semi-persistent communication.

(b) Specific Operation

The base station 100 (the reporting unit 157) generates, for example, DCI including information indicating the layer. The information indicating the layer may be a layer number of the layer.

The base station 100 (the communication processing unit 159) generates a CRC on the basis of, for example, an ID of the terminal device 200 (e.g., a radio network temporary ID (RNTI)), and adds the CRC to the DCI. Then, the base station 100 (the communication processing unit 159) performs encoding, rate matching, and multiplexing on the DCI to which the CRC has been added.

Meanwhile, the terminal device 200 monitors the PDCCH of each subframe on the basis of, for example, the ID (e.g., RNTI) of the terminal device 200 and finds out DCI destined for the terminal device 200. Then, the terminal device 200 (the information acquisition unit 241) acquires the DCI and acquires the information indicating the layer included in the DCI.

(c) Reporting of Other Information

The base station 100 (the reporting unit 157) reports, for example, a radio resource to be used in transmission of a codeword of the layer included in the DCI to the terminal device 200. Accordingly, the terminal device 200 can ascertain the radio resource of the layer allocated to the terminal device 200.

Furthermore, the base station 100 (the reporting unit 157) may report, for example, other information suitable for a transmission mode included in the DCI to the terminal device 200. The other information may include a modulation and coding scheme (MCS), a new data indicator (NDI), a power control command of a physical uplink control channel (PUCCH), and/or precoding information.

(3) Communication Processes

The base station 100 (the communication processing unit 159) performs, for example, a communication process for the plurality of layers (i.e., a plurality of layers that are subject to non-orthogonal multiplexing using a codebook).

The terminal device 200 (the information acquisition unit 241) acquires, for example, information indicating a layer allocated to the terminal device 200 among the plurality of layers. Then, the terminal device 200 (the communication processing unit 243) performs a communication process for the layer on the basis of the information indicating the layer.

(a) Downlink Case

The non-orthogonal multiplexing is performed in, for example, downlink. In this case, the base station 100 (the communication processing unit 159) performs a transmission process for the plurality of layers. Meanwhile, the terminal device 200 (the communication processing unit 243) performs a reception process for the layer allocated to the terminal device 200 among the plurality of layers.

(a-1) Transmission Process of Base Station 100

Generation of Codeword

The transmission process includes, for example, generation of a codeword of a layer from data of the layer for each of the plurality of layers. For example, the base station 100 (the communication processing unit 159) generates a codeword of a layer from data of the layer for each of the plurality of layers on the basis of a codebook for the layer.

The base station 100 (the communication processing unit 159) generates, for example, a codeword of Layer 1 from data of Layer 1 on the basis of a codebook (e.g., Codebook 1 illustrated in FIG. 3) for Layer 1. The base station 100 (the communication processing unit 159) generates, for example, a codeword of Layer 4 from data of Layer 4 on the basis of a codebook (e.g., Codebook 4 illustrated in FIG. 3) for Layer 4.

Mapping of Codewords to Radio Resources

The transmission process includes, for example, mapping of the codewords to radio resources to be used in transmission of the codewords for each of the plurality of layers.

The base station 100 (the communication processing unit 159) maps, for example, the codewords to the same block for each of the plurality of layers. More specifically, for example, the base station 100 (the communication processing unit 159) maps each signal element included in the codeword of each layer to a corresponding radio resource (e.g., a resource element) within the block. A specific example of this point will be described below with reference to FIG. 9.

FIG. 9 is an explanatory diagram for describing a first example of mapping of codewords of a plurality of layers to radio resources. Referring to FIG. 9, a block 10 is shown. In this example, Layers 1 to 6 are subject to non-multiplexing using codebooks. The base station 100 (the communication processing unit 159) generates codewords of Layers 1 to 6 on the basis of Codebooks 1 to 6 illustrated in FIG. 3. Then, the base station 100 (the communication processing unit 159) maps the codewords of Layers 1 to 6 to the block 10. More specifically, the base station 100 (the communication processing unit 159) maps first signal elements (signal elements that are not 0) of codewords of Layer 1, Layer 3, and Layer 5 to the resource element of a subcarrier 11 in the block 10. In addition, the base station 100 (the communication processing unit 159) maps second signal elements (signal elements that are not 0) of codewords of Layer 1, Layer 4, and Layer 6 to the resource element of a subcarrier 13 in the block 10. Furthermore, the base station 100 (the communication processing unit 159) maps third signal elements (signal elements that are not 0) of codewords of Layer 2, Layer 3, and Layer 6 to the resource element of a subcarrier 15 in the block 10. Moreover, the base station 100 (the communication processing unit 159) maps fourth signal elements (signal elements that are not 0) of codewords of Layer 2, Layer 4, and Layer 5 to the resource element of a subcarrier 17 in the block 10. Note that signal elements of codewords are not mapped to a resource element to which a reference signal is mapped, but are mapped to a resource element to which no reference signal is mapped.

FIG. 10 is an explanatory diagram for describing a second example of mapping of the codewords of the plurality of layers to radio resources. Referring to FIG. 10, the block 10 is shown. In this example, Layers 1 and 3 to 6 are subject to non-multiplexing using codebooks. The base station 100 (the communication processing unit 159) generates codewords of Layers 1 and 3 to 6. Then, the base station 100 (the communication processing unit 159) maps the codewords of Layers 1 and 3 to 6 to the block 10 similarly to the example of FIG. 9. Note that no codeword of Layer 2 is present and mapped to the block 10 in this example, unlike the example of FIG. 9.

As described above, the base station 100 (the communication processing unit 159) performs multiplexing by mapping the codewords of the plurality of layers to the same block. Note that, although signal elements of codewords of different layers are mapped to the same resource element, the signal elements may be mapped to the same resource element after the signal elements are added, or may be added after the signal elements are mapped to the same resource element.

Example of Overall Transmission Process

First Example

Figure 11:
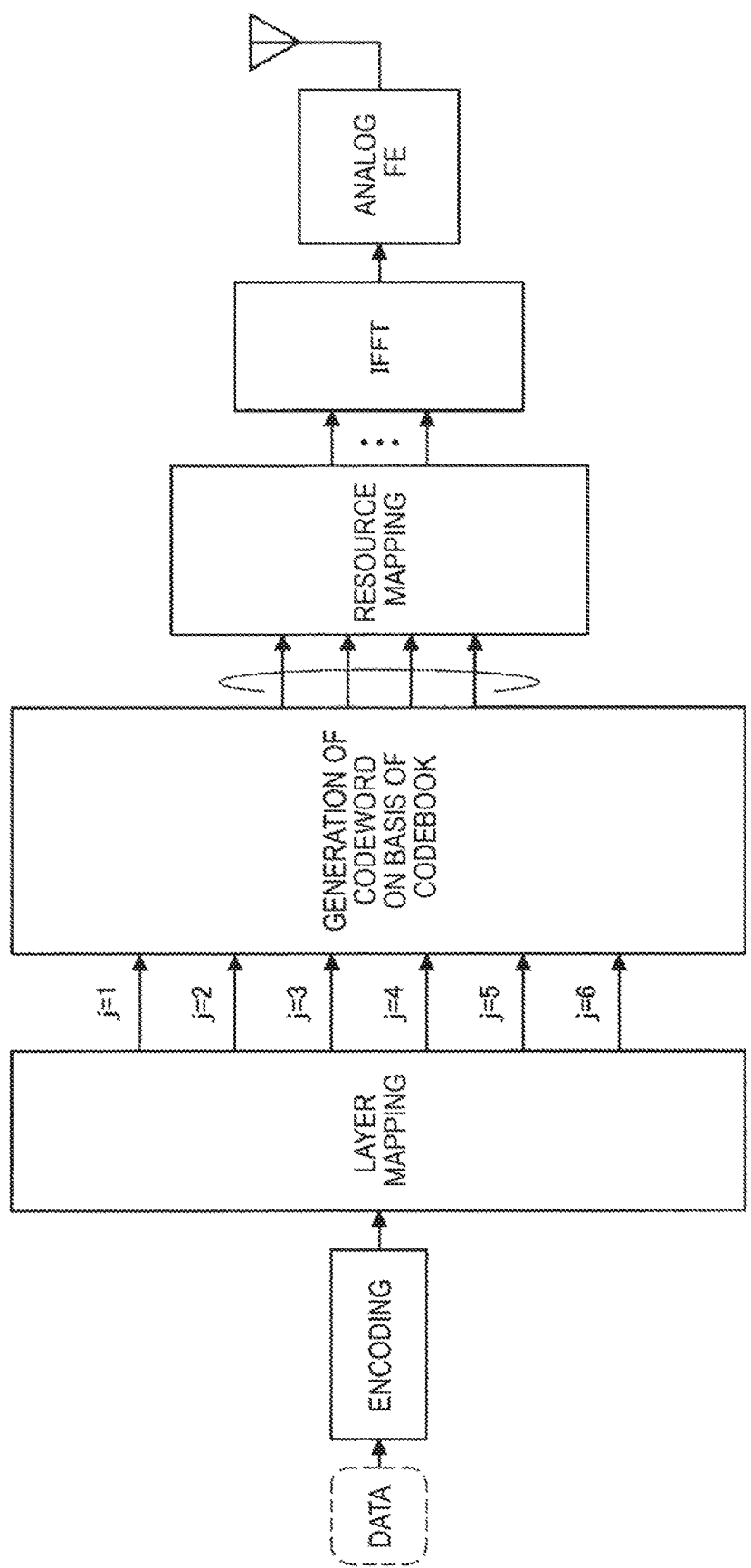
FIG. 11 is an explanatory diagram for describing a first example of an overall transmission process of a base station.

FIG. 11 is an explanatory diagram for describing a first example of an overall transmission process of the base station 100. The transmission process of the base station 100 includes, for example, encoding, layer mapping, generation of codewords based on codewords, resource mapping, an inverse fast Fourier transform (IFFT), and the like.

Second Example

Figure 12:
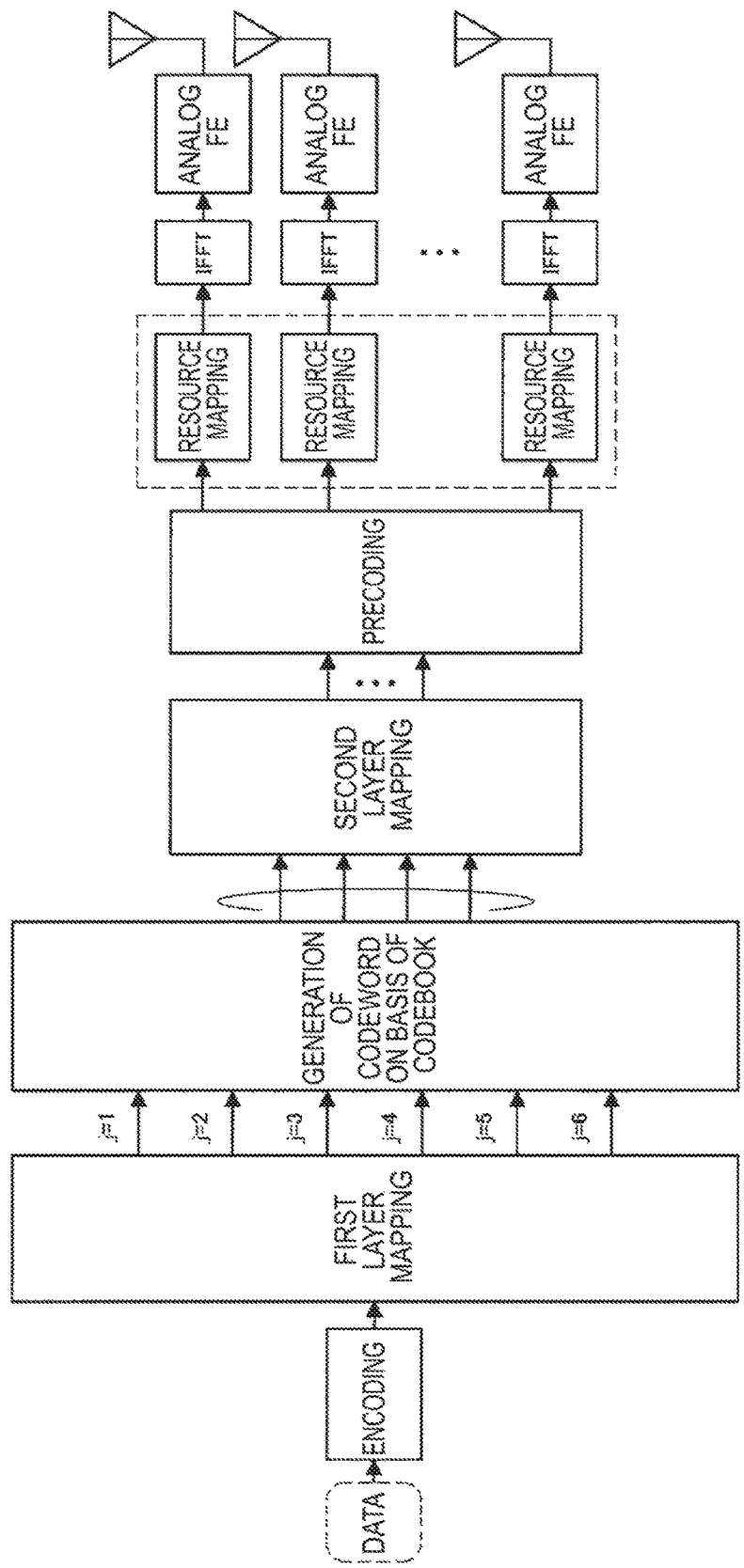
FIG. 12 is an explanatory diagram for describing a second example of an overall transmission process of a base station.

FIG. 12 is an explanatory diagram for describing a second example of an overall transmission process of the base station 100. The second example is an example of a multiple-input and multiple-output (MIMO) case. As illustrated in FIG. 12, the transmission process of the base station 100 in this case includes second layer mapping for spatial multiplexing in addition to first layer mapping for non-orthogonal multiplexing using a codebook. Furthermore, the transmission process includes precoding for spatial multiplexing. Codewords are, for example, mapped to transmission layers in the second layer mapping, weighted for each antenna in the precoding, and then transmitted. Note that the number of transmission layers is decided on with reference to, for example, a rank indicator (RI) reported by the terminal device 200 to the base station 100. In addition, a set of weights of the precoding is selected among predetermined set groups, for example, such that a total throughput of layers has a maximum value. The set of weights of the precoding is decided on with reference to, for example, a precoding matrix indicator (PMI) reported by the terminal device 200 to the base station 100.

(a-2) Reception Process of Terminal Device 200

The reception process includes, for example, decoding of data of the layer allocated to the terminal device 200 through SIC. The terminal device 200A (the communication processing unit 243) decodes the data of the layer on the basis of, for example, a codebook for the layer (and a codebook of another layer).

Layer 1 is allocated to, for example, the terminal device 200A. In this case, the terminal device 200A (the communication processing unit 243) removes signals (interference) of other layers in order of signals having greater levels of reception power from reception signals of radio resources allocated to the terminal device 200 through SIC and decodes data of Layer 1. Note that, in order to remove the signals of the other layers, the terminal device 200 decodes the data of Layer 1 through SIC on the basis not only of a codebook for Layer 1 but also of codebooks for the other layers.

(b) Uplink Case

The non-orthogonal multiplexing may be performed in uplink. In this case, the terminal device 200 (the communication processing unit 243) may perform a transmission process for the layer allocated to the terminal device 200 among the plurality of layers. Meanwhile, the base station 100 (the communication processing unit 159) may perform a reception process for the plurality of layers.

(b-1) Transmission Process of Terminal Device 200

Generation of Codeword

The transmission process may include generation of a codeword of the layer allocated to the terminal device 200 from data of the layer. The terminal device 200 (the communication processing unit 243) may generate a codeword of the layer from the data of the layer on the basis of a codebook for the layer.

Layer 1, for example, may be allocated to the terminal device 200A, and the terminal device 200A (the communication processing unit 243) may generate a codeword of Layer 1 from data of Layer 1 on the basis of Codebook 1 illustrated in FIG. 3 (a codebook for Layer 1).

Mapping of Codewords to Radio Resources

The transmission process may include, for example, mapping of the codeword of the layer to a radio resource to be used in transmission of the codeword of the layer allocated to the terminal device 200 (i.e., a radio resource allocated to the terminal device 200).

(b-2) Reception Process of Base Station 100

The reception process may include sequential decoding of data of each of the plurality of layers through SIC. The base station 100 (the communication processing unit 159) may sequentially decode the data of each of the plurality of layers on the basis of codebooks of the plurality of layers.

Layers 1 to 6 may be allocated to, for example, the terminal devices 200A to 200F, and the base station 100 (the communication processing unit 159) may sequentially decode data of each of Layers 1 to 6 through SIC.

(4) Selection and Use of Codebook Group

The base station 100 (the selection unit 153) selects, for example, a codebook group corresponding to the plurality of layers (i.e., a plurality of layers that are subject to non-orthogonal multiplexing using codebooks) among a plurality of codebook groups. Then, the base station 100 (the communication processing unit 159) performs a communication processes for the plurality of layers on the basis of the codebook group.

Accordingly, for example, radio resources can be used more efficiently when non-orthogonal multiplexing using codebooks is used.

(a) Codebook Group (a-1) First Codebook Group/Second Codebook Group

The plurality of codebook groups at least include, for example, first codebook group corresponding to a first number of layers and a second codebook group corresponding to a second number of layers which is smaller than the first number.

Specific Example

The first number of layers is, for example, an acceptable maximum number of layers, and the second number of layers is a smaller number of layers than the acceptable maximum number.

As an example, the first number (the acceptable maximum number) is 6, and the second number is 5. That is, the first codebook group is a codebook group corresponding to 6 layers, and the second codebook group is a codebook group corresponding to 5 layers. In this case, for example, the first codebook group includes 6 codebooks, and the second codebook group includes 5 codebooks.

The first codebook group is, for example, a group including Codebooks 1 to 6 illustrated in FIG. 3. The second codebook includes, for example, 5 codebooks (e.g., a codebook group proper for 5 layers) that are different from Codebooks 1 to 5 illustrated in FIG. 3. Alternatively, the second codebook group may include a codebook included in the first codebook group (e.g., Codebook 1 for Layer 1).

Selection of First Codebook Group/Second Codebook Group

Selection of First Codebook Group

The base station 100 (the selection unit 153) selects, for example, the first codebook group among the plurality of codebook groups when the number of layers of the plurality of layers (i.e., a plurality of layers that are subject to non-orthogonal multiplexing using codebooks) is the first number (e.g., 6).

Referring to FIG. 9 again, Layers 1 to 6 are, for example, subject to non-multiplexing using codebooks. In this case, the base station 100 (the selection unit 153) selects the first codebook group including codebooks for respective Layers 1 to 6.

Selection of Second Codebook Group

The base station 100 (the selection unit 153) selects, for example, the second codebook group among the plurality of codebook groups when the number of layers of the plurality of layers is the second number (e.g., 5).

Referring to FIG. 10 again, Layers 1 and 3 to 6 are, for example, subject to non-multiplexing using a codebook. In this case, the base station 100 (the selection unit 153) selects the second codebook group including codebooks for respective Layers 1 and 3 to 6.

Modulation Order

First Codebook Group and Second Codebook Group

At least one codebook included in the second codebook group, as well as any codebook included in the first codebook group, includes, for example, a codeword including signal elements with different modulation orders. More specifically, for example, the at least one codebook included in the second codebook group includes, for example, a codeword including a signal element with a higher modulation order than that of any codebook included in the first codebook group. The signal element with the higher modulation order is, for example, a signal element mapped to a radio resource to which signal elements of a smaller number of layers are mapped.

As described above, for example, the first codebook group is a codebook group including codebooks for respective Layers 1 to 6, and the codewords of Layers 1 to 6 are mapped to radio resources as illustrated in FIG. 9. On the other hand, the second codebook group is a codebook group including the codebooks for respective Layers 1 and 3 to 6 and the codewords of Layers 1 and 3 to 6 are mapped to radio resources as illustrated in FIG. 10. In this case, the codebooks for Layer 3 to 6 included in the second codebook group include, for example, a codeword including a signal element with a higher modulation order than that of any codebook for Layers 1 to 6 included in the first codebook group.

Referring to FIG. 10 again, only the signal elements of Layers 3 and 6 are mapped to the resource element of the subcarrier 15, and only the signal elements of Layers 4 and 5 are mapped to the resource element of the subcarrier 17. Thus, the signal elements that are mapped to the resource element of the subcarrier 15 and the resource element of the subcarrier 17 may be signals with higher modulation orders in accordance with a decrease of interference. Thus, for example, the codebooks for Layers 3 to 6 included in the second codebook group include codewords including the signal elements with the higher modulation order. A more specific example will be described below with reference to FIGS. 13 and 14.

Figure 13:
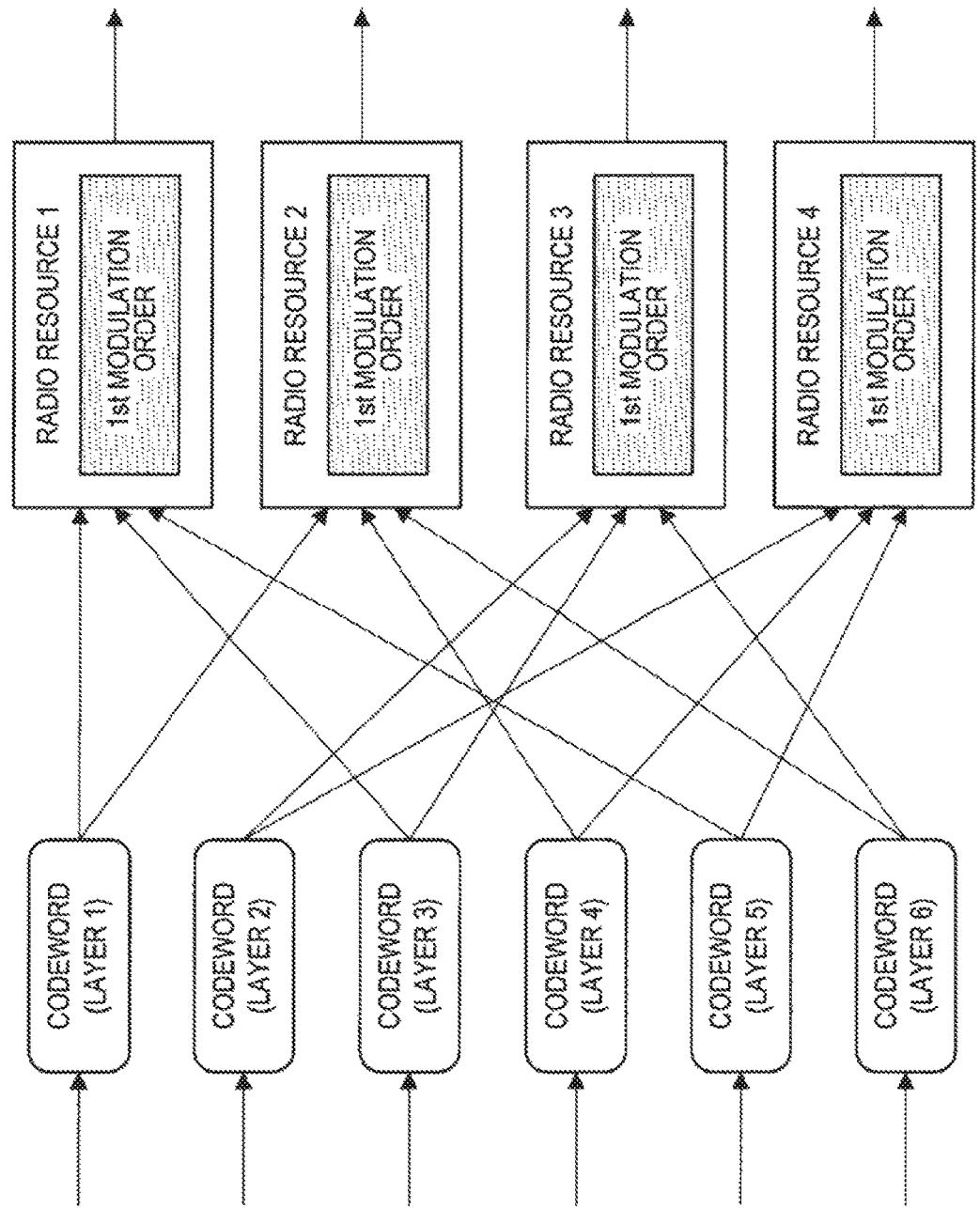
FIG. 13 is an explanatory diagram for describing examples of codewords generated on the basis of a first codebook group.

FIG. 13 is an explanatory diagram for describing examples of codewords generated on the basis of the first codebook group. Referring to FIG. 13, codewords of Layers 1 to 6 generated on the basis of the first codebook group and radio resources 1 to 4 are shown. Each of the radio resources 1 to 4 is, for example, a resource element. In this example, the codewords of respective Layers 1 to 6 each include two signal elements that are not 0, and each of the two signal elements is mapped to a corresponding radio resource among the radio resources 1 to 4. In particular, since three signal elements are mapped to each of the radio resources 1 to 4 in this example, all signal elements that are not 0 included in the codewords of Layers 1 to 6 are, for example, signal elements with a first modulation order.

Figure 14:
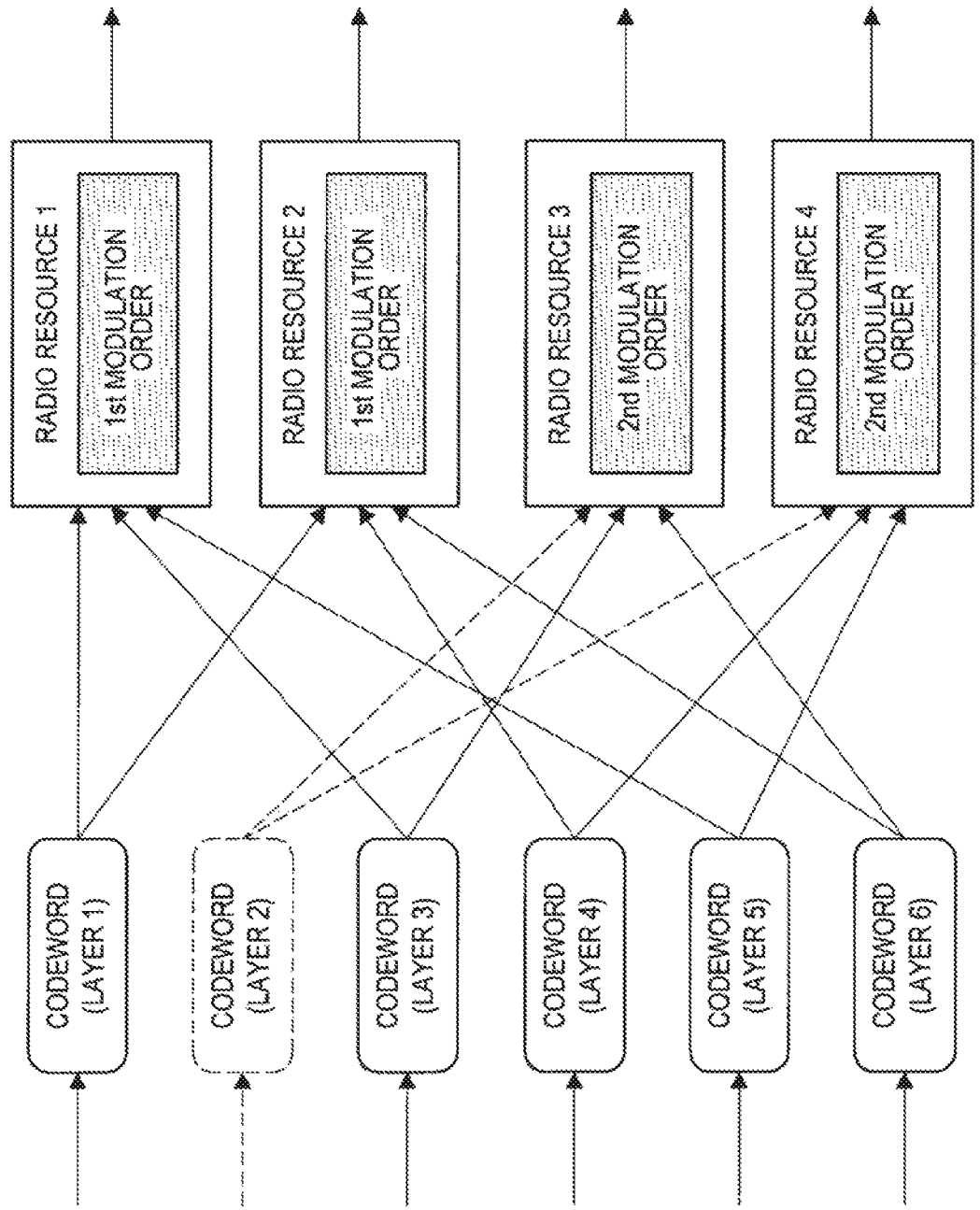
FIG. 14 is an explanatory diagram for describing examples of codewords generated on the basis of a second codebook group.

FIG. 14 is an explanatory diagram for describing examples of codewords generated on the basis of the second codebook group. Referring to FIG. 14, codewords of Layers 1 and 3 to 6 generated on the basis of the second codebook group and the radio resources 1 to 4 are shown. Each of the radio resources 1 to 4 is, for example, a resource element. In this example, the codewords of each of Layers 1 and 3 to 6 include two signal elements that are not 0, and each of the two signal elements is mapped to a corresponding radio resource among the radio resources 1 to 4. In particular, although three signal elements are mapped to each of the radio resources 1 and 2 in this example, only two signal elements are mapped to each of the radio resources 3 and 4. Thus, a first signal element included in the codeword of Layer 3 is a signal element with the first modulation order, and a third signal element included in the codeword of Layer 3 is a signal element with a second modulation order that is higher than the first modulation order. In addition, a second signal element included in the Layer 4 codeword is a signal element with the first modulation order, and a fourth signal element included in the codeword of Layer 4 is a signal element with the second modulation order. In addition, a first signal element included in the Layer 5 codeword is a signal element with the first modulation order, and a fourth signal element included in the codeword of Layer 5 is a signal element with the second modulation order. In addition, a second signal element included in the Layer 6 codeword is a signal element with the first modulation order, and a third signal element included in the codeword of Layer 6 is a signal element with the second modulation order. Note that the first and the second signal elements included in the codeword of Layer 1 are signal elements with the first modulation order.

Second Codebook Group

The second codebook group at least includes, for example, a signal element with the first modulation order and a signal element with the second modulation order that is different from the first modulation order.

As described above, the codebooks for respective Layers 3 to 6 included in the second codebook group include, for example, a signal element with the first modulation order and a signal element with the second modulation order.

Example of Modulation Order

Note that each of the first modulation order and the second modulation order may be a modulation order equivalent to any modulation order of binary phase shift keying (BPSK), quadrature phase shift keying (QPSK), 8-phase shift keying (PSK), 16-quadrature amplitude modulation (QAM), and 64-QAM, or may be another arbitrary modulation order.

Number of Codewords Included in Codebook

First Codebook Group and Second Codebook Group

At least one codebook included in the second codebook group includes, for example, a greater number of codewords than any codebook included in the first codebook group. In other words, the at least one codebook targets data having a greater size than any codebook included in the first codebook group.

The codebooks for respective Layers 1 to 6 included in the first codebook group include, for example, a first number of codewords. On the other hand, the codebooks for respective Layers 3 to 6 included in the second codebook group include a second number of codewords that is greater than the first number.

Second Codebook Group

A first codebook included in the second codebook group includes, for example, a larger number of codewords than a second codebook included in the second codebook group. In other words, the first codebook targets data having a greater size than the second codebook.

As described above, the codebooks for respective Layers 3 to 6 included in the second codebook group include, for example, the second number of codewords. On the other hand, the codebook for Layer 1 included in the second codebook group includes the first number of codewords.

Rate Control

The base station 100 (the communication processing unit 159) controls, for example, a data rate of each layer. More specifically, for example, the base station 100 (the communication processing unit 159) controls a size of data transmitted on each layer. Note that the base station 100 may have a rate control buffer to control data rates.

(a-2) Another Codebook Group

The plurality of codebook groups further include, for example, codebooks other than the first codebook (e.g., a codebook corresponding to the first number of layers) and the second codebook (e.g., a codebook corresponding to the second number of layers).

As an example, the plurality of codebook groups may further include codebooks corresponding to a third number. The third number may be smaller than the second number.

As another example, the plurality of codebook groups may include other codebooks corresponding to the second number of layers. For example, the second codebook includes the codebooks for Layers 1 and 3 to 6 and the other codebooks may include codebooks for Layers 2 to 6. As described above, the plurality of codebook groups may include two or more codebooks corresponding to the same number of layers.

Alternatively, the plurality of codebook groups may include one codebook for each number of layers, without including two or more codebooks corresponding to the same number of layers. In this case, layers to be used may be pre-determined in accordance with the number of layers.

(b) Reporting to Terminal Device

Reporting of Codebook Group

The base station 100 (the reporting unit 157) reports, for example, the codebook group (i.e., the codebook group selected among the plurality of codebook groups) to the terminal device 200.

More specifically, for example, the base station 100 (the reporting unit 157) reports the codebook group included in DCI to the terminal device 200. For example, the base station 100 (the reporting unit 157) generates DCI including information indicating the codebook group. The information indicating the codebook group may be identification information of the codebook group (e.g., a group number of the codebook group).

Accordingly, the terminal device 200 can ascertain, for example, the codebook group to be used.

Reporting of Plurality of Layers

Alternatively, the base station 100 (the reporting unit 157) may report the plurality of layers or the number of layers of the plurality of layers to the terminal device 200.

More specifically, the base station 100 (the reporting unit 157) may report the plurality of layers or the number of layers included in DCI to the terminal device 200. For example, the base station 100 (the reporting unit 157) may generate DCI which includes information indicating each of the plurality of layers (e.g., a set of layer numbers of the plurality of respective layers) or information indicating the number of layers. Then, the terminal device 200 may decide on a codebook group to be used by the terminal device 200 on the basis of the plurality of layers or the number of layers.

Accordingly, the terminal device 200 can, for example, ascertain a codebook group to be used.

Reporting of Plurality of Codebook Groups

The base station 100 (the reporting unit 157) may report the plurality of codebook groups to the terminal device 200.

More specifically, the base station 100 (the reporting unit 157) may report the plurality of codebook groups to the terminal device 200 through signaling to the terminal device 200 or from system information.

(c) Operation of Terminal Device

The terminal device 200 (the communication processing unit 243) performs the communication process for the layer on the basis of, for example, a codebook group corresponding to the plurality of layers among the plurality of codebook groups. The communication process is as described above.

(d) Execution Under Specific Condition

The base station 100 may select a codebook group and perform a communication process based on the codebook group when the terminal device 200 is in proximity to the base station 100 (i.e., when a signal-to-noise (SN) ratio is sufficiently favorable and influence of interference is dominant).

As described above, a codebook group is selected and a communication process is performed on the basis of the codebook group. Accordingly, for example, radio resources can be used more efficiently. More specifically, when the number of layers is smaller, for example, there are radio resources to which fewer signal elements (i.e., signal elements of codewords of fewer layers) are mapped, interference between the radio resources decreases. For this reason, a modulation order of the radio resources can be heightened, and thus data having a greater size can be transmitted on several layers. As a result, the radio resources can be used more efficiently.

«5. Process Flow»

Next, examples of processes according to the embodiment of the present disclosure will be described with reference to FIGS. 15 and 16.

(1) Downlink Case

Figure 15:
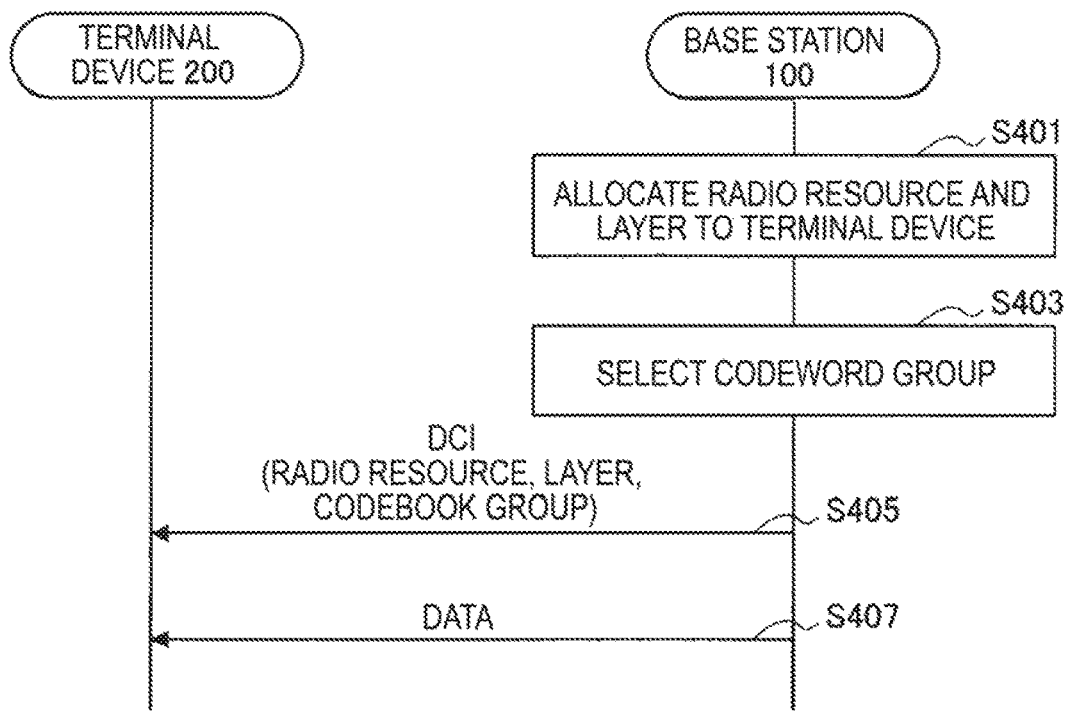
FIG. 15 is a flowchart showing a first example of a schematic flow of a process according to the embodiment.

FIG. 15 is a flowchart showing a first example of a schematic flow of a process according to the embodiment of the present disclosure. The first example is an example in which non-orthogonal multiplexing using a codebook is performed in downlink.

The base station 100 allocates a downlink radio resource and a layer included in a plurality of layers that are subject to non-orthogonal multiplexing using a codebook to the terminal device 200 (S401). Then, the base station 100 selects a codebook group corresponding to the plurality of layers among a plurality of codebook groups (S403).

The base station 100 transmits DCI destined for the terminal device 200 (S405). In particular, the base station 100 reports the radio resource and the layer allocated to the terminal device 200 and the codebook group included in the DCI to the terminal device 200.

The terminal device 200 acquires the DCI, and acquires information indicating the radio resource, information indicating the layer, and information indicating the codebook group from the DCI.

The base station 100 transmits data on each of the plurality of layers (S407). In particular, the base station 100 performs a transmission process for each of the plurality of layers on the basis of the codebook group. The transmission process includes generation of a codeword of a layer from data of the layer for each of the plurality of layers.

The terminal device 200 receives the data transmitted on the layer allocated to the terminal device 200. In particular, the base station 100 performs a reception process for the layer on the basis of the information indicating the radio resource, the information indicating the layer, and the codebook group.

(2) Uplink Case

Figure 16:
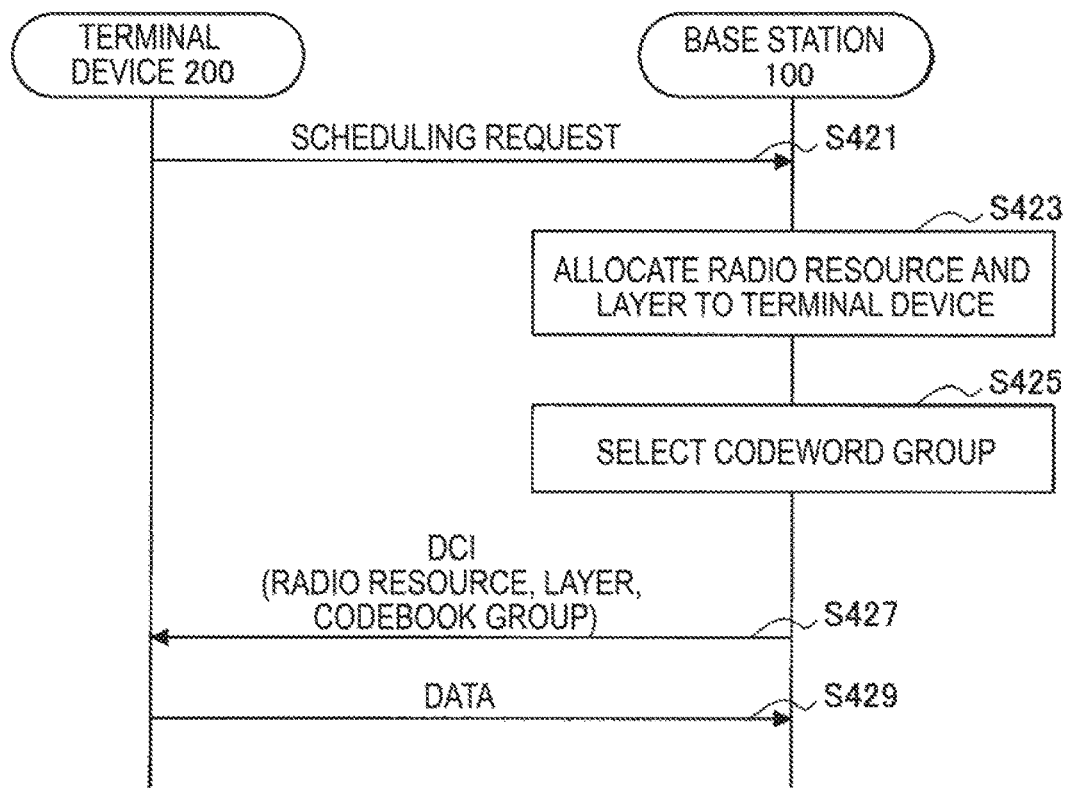
FIG. 16 is a flowchart showing a second example of a schematic flow of a process according to the embodiment.

FIG. 16 is a flowchart showing a second example of a schematic flow of a process according to the embodiment of the present disclosure. The second example is an example in which non-orthogonal multiplexing using a codebook is performed in uplink.

The terminal device makes a scheduling request (S421), and the base station 100 allocates an uplink radio resource and a layer included in a plurality of layers that are subject to non-orthogonal multiplexing using a codebook to the terminal device 200 (S423). Then, the base station 100 selects a codebook group corresponding to the plurality of layers among a plurality of codebook groups (S425).

The base station 100 transmits DCI destined for the terminal device 200 (S427). In particular, the base station 100 reports the radio resource and the layer allocated to the terminal device 200, and the codebook group included in DCI to the terminal device 200.

The terminal device 200 acquires the DCI and acquires information indicating the radio resource, information indicating the layer, and information indicating the codebook group from the DCI.

The terminal device 200 transmits data on the layer allocated to the terminal device 200 (S429). In particular, the terminal device 200 performs a transmission process for the layer on the basis of the information indicating the radio resource, the information indicating the layer, and the codebook group (in particular, codebooks for the layer included in the codebook group). The transmission process includes generation of a codeword of the layer from data of the layer.

The base station 100 receives the data transmitted on each of the plurality of layers. In particular, the base station 100 performs a reception process for each of the plurality of layers on the basis of the codebook group.

«6. Application Example»

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

<6.1. Application Examples with Regard to Base Station>
(First Application Example)

Figure 17:
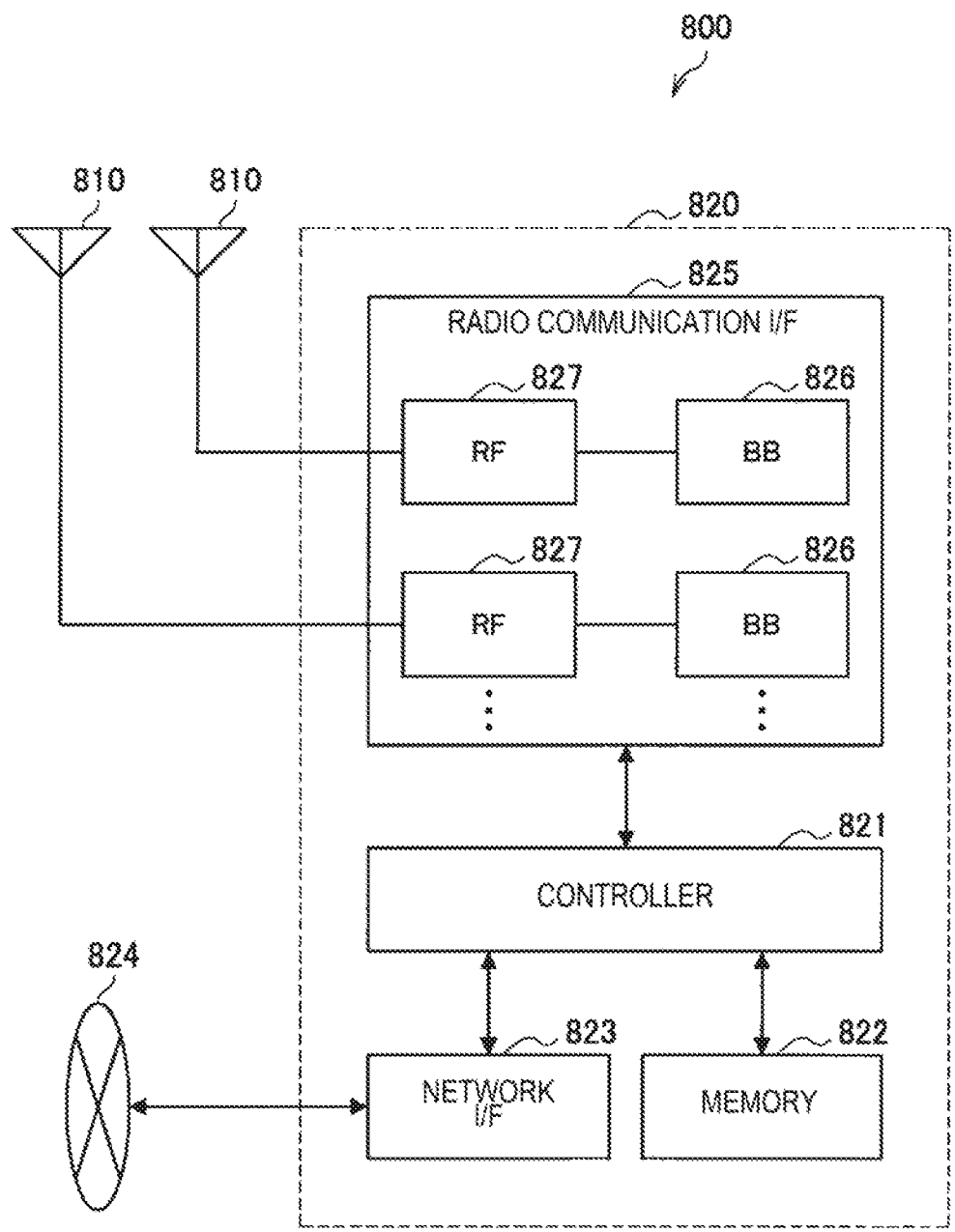
FIG. 17 is a block diagram illustrating a first example of a schematic configuration of an eNB.

FIG. 17 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 17. For example, the multiple antennas 810 may be compatible with multiple frequency bands used by the eNB 800. Although FIG. 17 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 17. For example, the multiple BB processors 826 may be compatible with multiple frequency bands used by the eNB 800. The radio communication interface 825 may include the multiple RF circuits 827, as illustrated in FIG. 17. For example, the multiple RF circuits 827 may be compatible with multiple antenna elements. Although FIG. 17 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 17, one or more structural elements included in the processing unit 150 (the allocation unit 151, the selection unit 153, the information acquisition unit 155, the reporting unit 157, and/or the communication processing unit 159) described with reference to FIG. 6 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided.

In addition, in the eNB 800 shown in FIG. 17, the radio communication unit 120 described with reference to FIG. 6 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

(Second Application Example)

Figure 18:
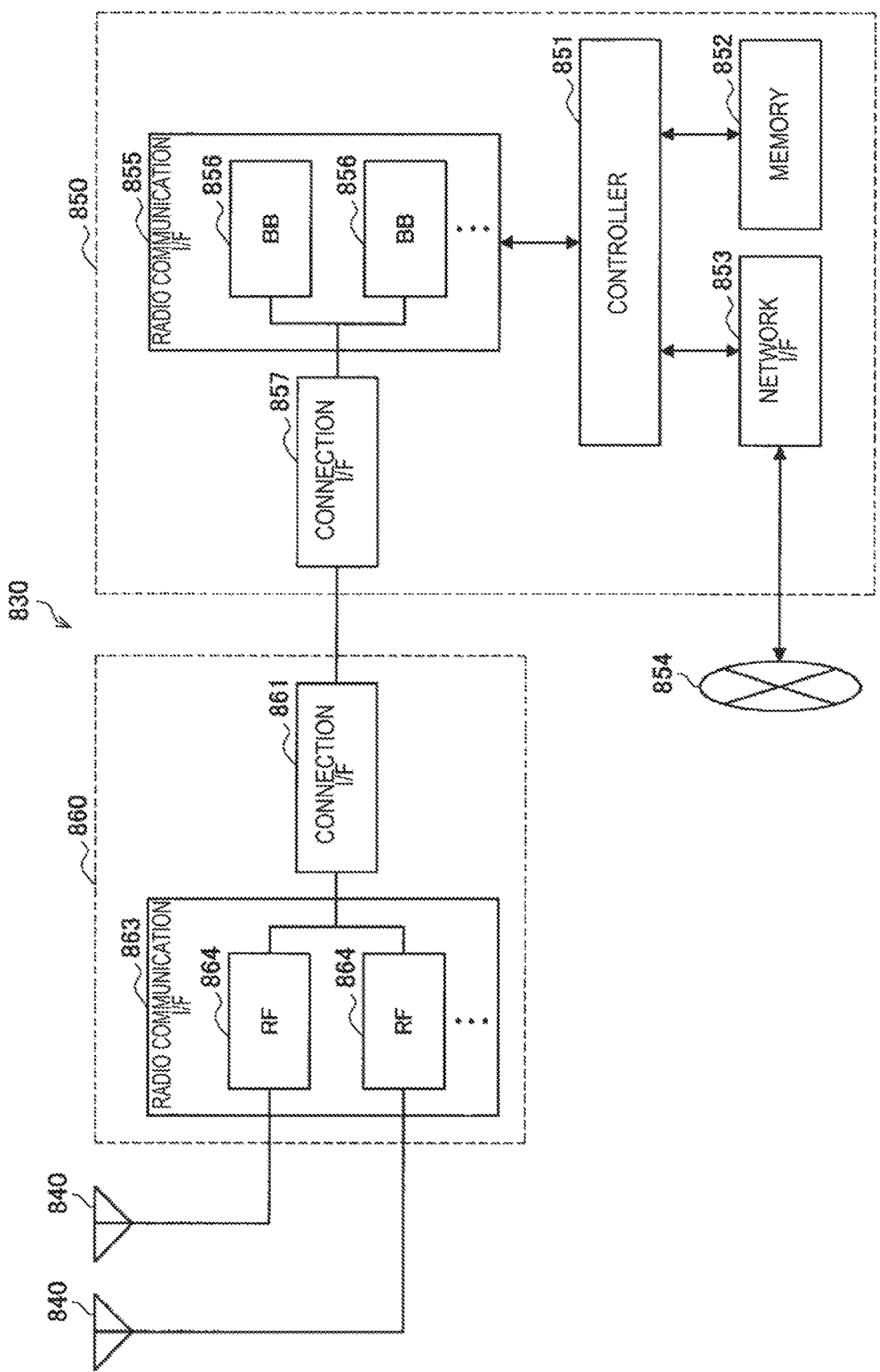
FIG. 18 is a block diagram illustrating a second example of the schematic configuration of the eNB.

FIG. 18 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 18. For example, the multiple antennas 840 may be compatible with multiple frequency bands used by the eNB 830. Although FIG. 18 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except the BB processor 856 is connected to the RF circuit 864 of the RRH 860 via the connection interface 857. The radio communication interface 855 may include the multiple BB processors 856, as illustrated in FIG. 18. For example, the multiple BB processors 856 may be compatible with multiple frequency bands used by the eNB 830. Although FIG. 18 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 18. For example, the multiple RF circuits 864 may support multiple antenna elements. Although FIG. 18 illustrates the example in which the radio communication interface 863 includes the multiple RF circuits 864, the radio communication interface 863 may also include a single RF circuit 864.

In the eNB 830 shown in FIG. 18, one or more structural elements included in the processing unit 150 (the allocation unit 151, the selection unit 153, the information acquisition unit 155, the reporting unit 157, and/or the communication processing unit 159) described with reference to FIG. 6 may be implemented by the radio communication interface 855 and/or the radio communication interface 863, Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided.

Figure 6:
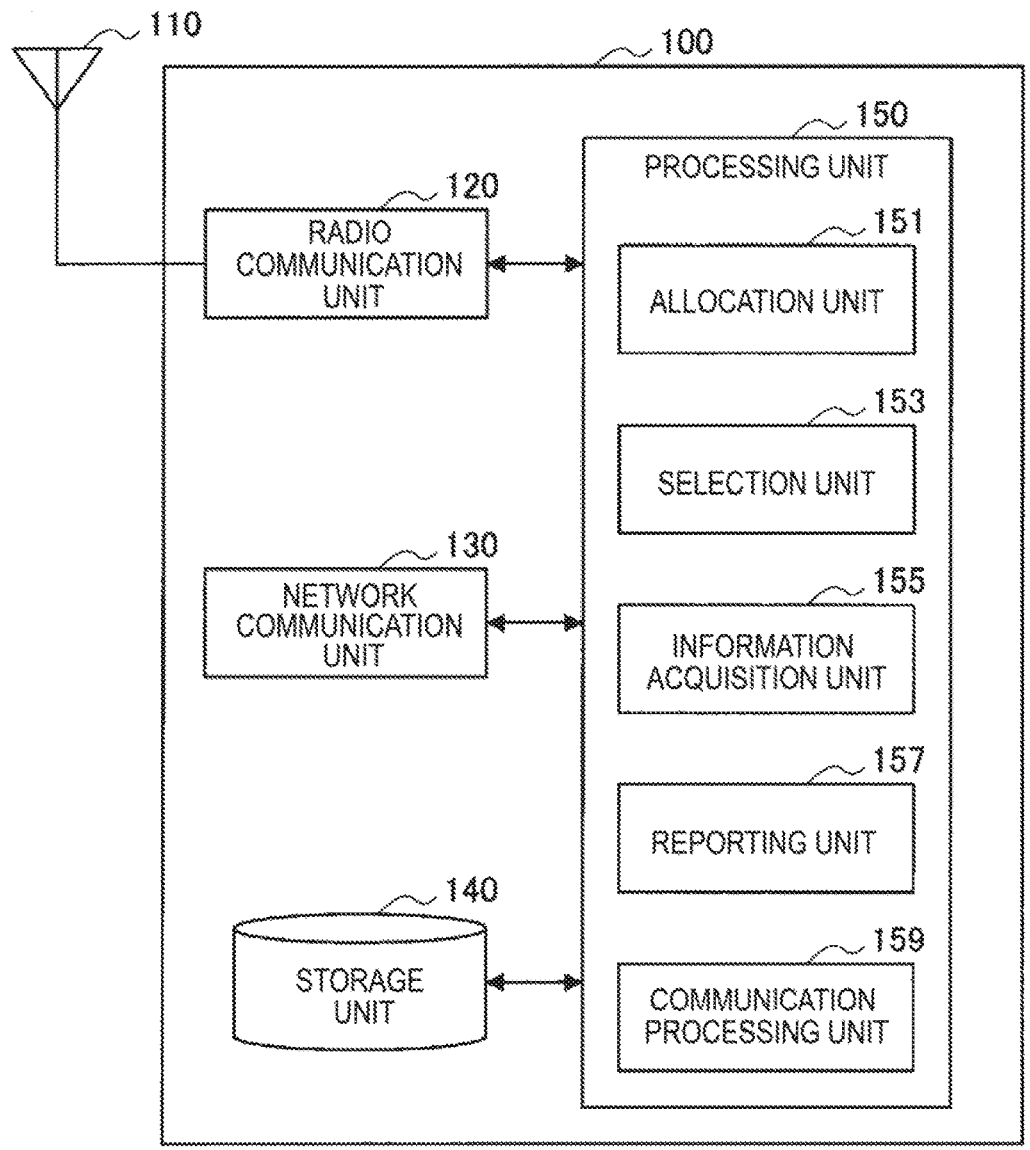
FIG. 6 is a block diagram illustrating an example of a configuration of a base station according to the embodiment.

In addition, in the eNB 830 shown in FIG. 18, the radio communication unit 120 described, for example, with reference to FIG. 6 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853.

<6.2. Application Examples with Regard to Terminal device>

(First Application Example)

Figure 19:
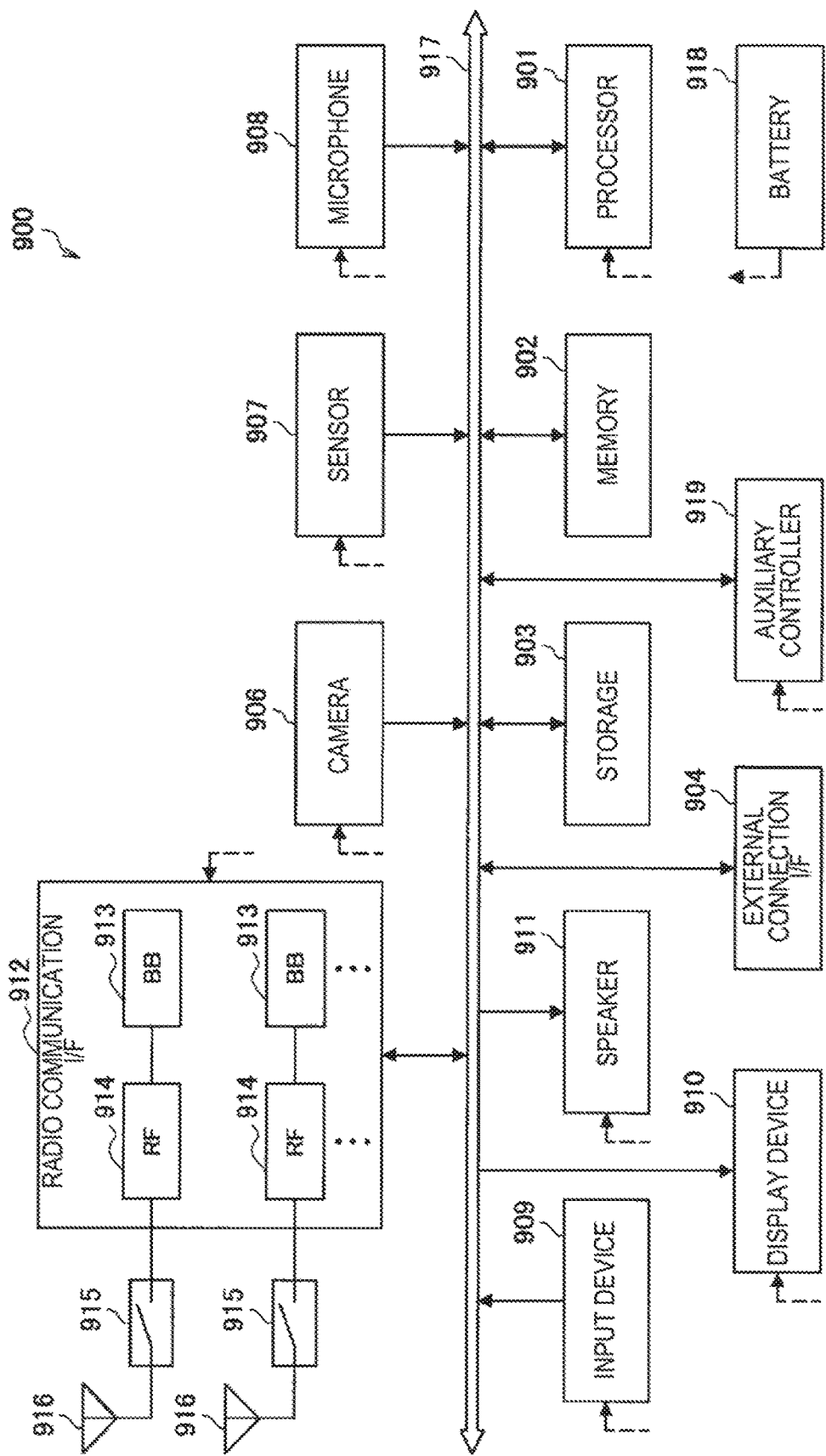
FIG. 19 is a block diagram illustrating an example of a schematic configuration of a smartphone.

FIG. 19 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 913 may also be a one chip module that has the BB processor 913 and the RF circuit 914 integrated thereon. The radio communication interface 912 may include the multiple BB processors 913 and the multiple RF circuits 914, as illustrated in FIG. 19. Although FIG. 19 illustrates the example in which the radio communication interface 913 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in a MIMO antenna), and is used for the radio communication interface 912 to transmit and receive radio signals. The smartphone 900 may include the multiple antennas 916, as illustrated in FIG. 19. Although FIG. 19 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 19 via feeder lines, which are partially shown as dashed lines in the figure. The auxiliary controller 919 operates a minimum necessary function of the smartphone 900, for example, in a sleep mode.

In the smartphone 900 shown in FIG. 19, the information acquisition unit 241 and the communication processing unit 243 described with reference to FIG. 7 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the information acquisition unit 241 and the communication processing unit 243 may be implemented by the module. In this case, the module may store a program for causing the processor to function as the information acquisition unit 241 and the communication processing unit 243 (i.e., a program for causing the processor to execute operations of the information acquisition unit 241 and the communication processing unit 243) and may execute the program. As another example, the program for causing the processor to function as the information acquisition unit 241 and the communication processing unit 243 may be installed in the smartphone 900, and the radio communication interface 912 (for example, the BB processor 913), the processor 901 and/or the auxiliary controller 919 may execute the program. As described above, the smartphone 900 or the module may be provided as a device which includes the information acquisition unit 241 and the communication processing unit 243, and the program for causing the processor to function as the information acquisition unit 241 and the communication processing unit 243 may be provided. In addition, a readable recording medium in which the program is recorded may be provided.

Figure 7:
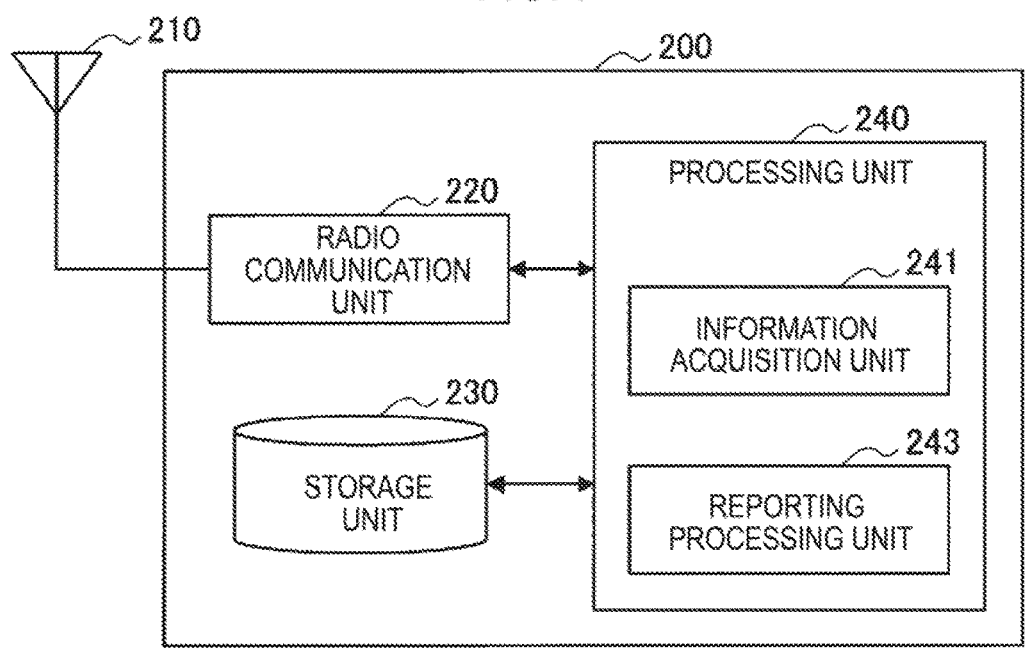
FIG. 7 is a block diagram illustrating an example of a configuration of a terminal device according to the embodiment.

In addition, in the smartphone 900 shown in FIG. 19, the radio communication unit 220 described, for example, with reference to FIG. 7 may be implemented by the radio communication interface 912 (for example, the RF circuit 914). Moreover, the antenna unit 210 may be implemented by the antenna 916.

(Second Application Example)

FIG. 20 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 20. Although FIG. 20 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 20. Although FIG. 20 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 20 via feeder lines that are partially shown as dashed lines in the figure. The battery 938 accumulates power supplied form the vehicle.

In the car navigation device 920 shown in FIG. 20, the information acquisition unit 241 and the communication processing unit 243 described with reference to FIG. 7 may be implemented by the radio communication interface 933. Alternatively, at least some of these constituent elements may be implemented by the processor 921. As an example, a module which includes a part (for example, the BB processor 934) or all of the radio communication interface 933 and/or the controller 921 may be mounted in the car navigation device 920, and the information acquisition unit 241 and the communication processing unit 243 may be implemented by the module. In this case, the module may store a program for causing the processor to function as the information acquisition unit 241 and the communication processing unit 243 (i.e., a program for causing the processor to execute operations of the information acquisition unit 241 and the communication processing unit 243) and may execute the program. As another example, the program for causing the processor to function as the information acquisition unit 241 and the communication processing unit 243 may be installed in the car navigation device 920, and the radio communication interface 933 (for example, the BB processor 934) and/or the controller 921 may execute the program. As described above, the car navigation device 920 or the module may be provided as a device which includes the information acquisition unit 241 and the communication processing unit 243, and the program for causing the processor to function as the information acquisition unit 241 and the communication processing unit 243 may be provided. In addition, a readable recording medium in which the program is recorded may be provided.

In addition, in the car navigation device 920 shown in FIG. 20, the radio communication unit 220 described, for example, with reference to FIG. 7 may be implemented by the radio communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the information acquisition unit 241 and the communication processing unit 243. The vehicle module 942 generates vehicle data such as vehicle speed, engine speed, and trouble information, and outputs the generated data to the in-vehicle network 941.

«7. Conclusion»

So far, devices and processes according to the embodiment of the present disclosure have been described with reference to FIGS. 5 to 20.

According to the embodiment of the present disclosure, the base station 100 includes the information acquisition unit 155 which acquires information indicating layer allocated to the terminal device 200 among a plurality of layers that are subject to non-orthogonal multiplexing using a codebook and the reporting unit 157 which reports the layer to the terminal device 200.

In addition, according to the embodiment of the present disclosure, the terminal device 200 includes the information acquisition unit 241 which acquires information indicating a layer allocated to the terminal device 200 among a plurality of layers that are subject to non-orthogonal multiplexing using a codebook and the communication processing unit 243 which performs a communication process for the layer on the basis of the information indicating the layer.

Accordingly, for example, the terminal device can ascertain the layer allocated to the terminal device when non-orthogonal multiplexing using a codebook is used.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the allocation unit, the selection unit, the information acquisition unit, the reporting unit, and/or the communication processing unit) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the allocation unit, the selection unit, the information acquisition unit, the reporting unit, and/or the communication processing unit) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A device including:

an acquisition unit configured to acquire information indicating a layer allocated to a terminal device among a plurality of layers that are subject to non-orthogonal multiplexing using a codebook; and a reporting unit configured to report the layer to the terminal device.

(2)

The device according to (1), wherein the reporting unit reports the layer included in downlink control information to the terminal device.

(3)

The device according to (2), wherein the reporting unit reports a radio resource to be used in transmission of a codeword of the layer included in the downlink control information to the terminal device.

(4)

The device according to any one of (1) to (3), further including:

a selection unit configured to select a codebook group corresponding to the plurality of layers among a plurality of codebook groups; and a communication processing unit configured to perform a communication process for the plurality of layers on the basis of the codebook group.

(5)

The device according to (4), wherein the plurality of codebook groups at least include a first codebook group corresponding to a first number of layers and a second codebook group corresponding to a second number of layers that is smaller than the first number.

(6)

The device according to (5), wherein the first number of layers is an acceptable maximum number of layers, and the second number of layers is a smaller number of layers than the acceptable maximum number.

(7)

The device according to (5) or (6), wherein at least one codebook included in the second codebook group, as well as any codebook included in the first codebook group, includes a codeword including signal elements with different modulation orders.

(8)

The device according to (7), wherein the at least one codebook included in the second codebook group includes a codeword including a signal element with a higher modulation order than a signal element of any codebook included in the first codebook group, and the signal element with the higher modulation order is a signal element that is mapped to a radio resource to which signal elements of a smaller number of layers are mapped.

(9)

The device according to any one of (5) to (8), wherein the second codebook group at least includes a signal element with a first modulation order and a signal element with a second modulation order that is different from the first modulation order.

(10)

The device according to any one of (5) to (9), wherein at least one codebook included in the second codebook group includes a greater number of codewords than any codebook included in the first codebook group.

(11)

The device according to any one of (4) to (10), wherein the communication process is a transmission process for the plurality of layers.

(12)

The device according to (11), wherein the transmission process includes generation of a codeword of a layer from data of the layer for each of the plurality of layers.

(13)

The device according to any one of (4) to (10), wherein the communication process is a reception process for the plurality of layers.

(14)

The device according to any one of (4) to (13), wherein the reporting unit reports the codebook group, or the plurality of layers or the number of layers of the plurality of layers to the terminal device.

(15)

The device according to any one of (1) to (14), further including:

an allocation unit configured to allocate each of the plurality of layers to a terminal device, wherein the allocation unit changes the number of layers of the plurality of layers that are subject to the non-orthogonal multiplexing in accordance with a change of traffic.

(16)

A method performed by a processor, the method including:

acquiring information indicating a layer allocated to a terminal device among a plurality of layers that are subject to non-orthogonal multiplexing using a codebook; and reporting the layer to the terminal device.

(17)

A device including:

an acquisition unit configured to acquire information indicating a layer allocated to a terminal device among a plurality of layers that are subject to non-orthogonal multiplexing using a codebook; and a communication processing unit configured to perform a communication process for the layer on the basis of the information indicating the layer.

(18)

The device according to (17), wherein the communication process is a reception process for the layer.

(19)

The device according to (17), wherein the communication process is a transmission process for the layer.

(20)

The device according to any one of (17) to (19), wherein the communication processing unit performs the communication process for the layer on the basis of a codebook group corresponding to the plurality of layers among a plurality of codebook groups.

(21)

A program for causing a processor to execute:

acquiring information indicating a layer allocated to a terminal device among a plurality of layers that are subject to non-orthogonal multiplexing using a codebook; and reporting the layer to the terminal device.

(22)

A readable recording medium having a program recorded thereon, the program being for causing a processor to execute:

acquiring information indicating a layer allocated to a terminal device among a plurality of layers that are subject to non-orthogonal multiplexing using a codebook; and reporting the layer to the terminal device.

(23)

A method performed by a processor, the method including:

acquiring information indicating a layer allocated to a terminal device among a plurality of layers that are subject to non-orthogonal multiplexing using a codebook; and performing a communication process for the layer on the basis of the information indicating the layer.

(24)

A program for causing a processor to execute:

acquiring information indicating a layer allocated to a terminal device among a plurality of layers that are subject to non-orthogonal multiplexing using a codebook; and performing a communication process for the layer on the basis of the information indicating the layer.

(25)

A readable recording medium having a program recorded thereon, the program being for causing a processor to execute:

acquiring information indicating a layer allocated to a terminal device among a plurality of layers that are subject to non-orthogonal multiplexing using a codebook; and performing a communication process for the layer on the basis of the information indicating the layer.

REFERENCE SIGNS LIST 1 system
10 block
11, 13, 15, 17 subcarrier
100 base station
101 cell
151 allocation unit
153 selection unit
155 information acquisition unit
157 reporting unit
159 communication processing unit
200 terminal device
241 information acquisition unit
243 communication processing unit

The invention claimed is:

1. A device, comprising:
   at least one processor configured to:
      allocate at least one layer of a plurality of layers to a terminal device;
      change, based on a change in traffic, a number of layers of the plurality of layers,
         wherein the plurality of layers are subjected to a non-orthogonal multiplexing operation based on a codebook;
      acquire information that indicates the at least one layer of the plurality of layers is allocated to the terminal device;
      select one of a first codebook group of a plurality of codebook groups or a second codebook group of the plurality of codebook groups based on a first number of layers of the first codebook group and a second number of layers of the second codebook group,
         wherein the second number of layers is smaller than the first number of layers;
      transmit the at least one layer and the selected one of the first codebook group or the second codebook group, to the terminal device; and
      transmit data associated with the at least one layer based on the selected one of the first codebook group or the second codebook group,
         wherein the transmission of the data includes generation of a codeword of the at least one layer based on the data associated with the at least one layer.

2. The device according to claim 1, wherein the at least one processor is further configured to transmit downlink control information to the terminal device, wherein the downlink control information includes the at least one layer that is allocated to the terminal device.

3. The device according to claim 2, wherein the at least one processor is further configured to transmit a radio resource for transmission of the codeword associated with the at least one layer included in the downlink control information.

4. The device according to claim 1, wherein the at least one processor is further configured to execute a communication process for the plurality of layers based on the selected one of the first codebook group or the second codebook group.

5. The device according to claim 4, wherein the communication process is a reception process for the plurality of layers.

6. The device according to claim 4, wherein the at least one processor is further configured to transmit at least one of the selected one of the first codebook group or the second codebook group, or the plurality of layers or the number of layers of the plurality of layers to the terminal device.

7. The device according to claim 1, wherein
the first number of layers corresponds to a threshold value, and
the second number of layers is smaller than the threshold value.

8. The device according to claim 1, wherein at least a codebook of the second codebook group and at least a codebook of the first codebook group, include a codeword having signal elements of different modulation orders.

9. The device according to claim 8, wherein
the at least codebook of the second codebook group includes the codeword of a signal element with a modulation order that is higher than a modulation order of a signal element of the at least codebook of the first codebook group,
the signal element with the higher modulation order is mapped to a radio resource, and
signal elements of the second number of layers are mapped to the radio resource.

10. The device according to claim 1, wherein:
the second codebook group includes a signal element of a first modulation order and a signal element with a second modulation order, and
the second modulation order is different from the first modulation order.

11. The device according to claim 1, wherein at least a codebook of the second codebook group includes a greater number of codewords than at least a codebook of the first codebook group.

12. A method, comprising:
allocating at least one layer of a plurality of layers to a terminal device;
changing, based on a change in traffic, a number of layers of the plurality of layers,
wherein the plurality of layers are subjected to a non-orthogonal multiplexing operation based on a codebook;
acquiring information that indicates the at least one layer of the plurality of layers is allocated to the terminal device;
selecting one of a first codebook group of a plurality of codebook groups or a second codebook group of the plurality of codebook groups based on a first number of layers of the first codebook group and a second number of layers of the second codebook group,
wherein the second number of layers is smaller than the first number of layers;
transmitting the at least one layer and the selected one of the first codebook group or the second codebook group, to the terminal device; and
transmitting data associated with the at least one layer based on the selected one of the first codebook group or the second codebook group,
wherein the transmission of the data includes generation of a codeword of the at least one layer based on the data associated with the at least one layer.

13. A device, comprising:
at least one processor configured to:
allocate at least one layer of a plurality of layers to a terminal device;
change, based on a change in traffic, a number of layers of the plurality of layers,
wherein the plurality of layers are subjected to a non-orthogonal multiplexing operation based on a codebook;
acquire information that indicates the at least one layer of the plurality of layers is allocated to the terminal device;
select one of a first codebook group of a plurality of codebook groups or a second codebook group of the plurality of codebook groups based on a first number of layers of the first codebook group and a second number of layers of the second codebook group,
wherein the second number of layers is smaller than the first number of layers; and
execute a communication process for the at least one layer based on the selected one of the first codebook group or the second codebook group, and the information that indicates the at least one layer is allocated to the terminal device.

14. The device according to claim 13, wherein the communication process is a reception process for the at least one layer.

15. The device according to claim 13, wherein the communication process is a transmission process for the at least one layer.

16. The device according to claim 13, wherein the at least one processor is further configured to execute the communication process for the at least one layer based on a third codebook group of the plurality of codebook groups corresponding to the plurality of layers.

* * * * *